(12) United States Patent
Ochi

(10) Patent No.: US 8,143,748 B2
(45) Date of Patent: Mar. 27, 2012

(54) POWER SUPPLY WITH STANDBY POWER

(75) Inventor: Sam Seiichiro Ochi, Saratoga, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 370 days.

(21) Appl. No.: 12/472,539

(22) Filed: May 27, 2009

(65) Prior Publication Data

US 2009/0295228 A1    Dec. 3, 2009

Related U.S. Application Data

(60) Provisional application No. 61/056,109, filed on May 27, 2008, provisional application No. 61/056,112, filed on May 27, 2008.

(51) Int. Cl.
*H01H 31/10* (2006.01)
*G06F 1/26* (2006.01)
(52) U.S. Cl. ........................................ 307/115; 713/320
(58) Field of Classification Search .................. 713/320, 713/323; 307/112, 115
See application file for complete search history.

(56) References Cited

U.S. PATENT DOCUMENTS

| | | | |
|---|---|---|---|
| 5,949,154 A | 9/1999 | Williams | |
| 6,362,541 B1 | 3/2002 | Kawata | |
| 6,430,062 B1 | 8/2002 | Shin | |
| 7,321,223 B2 | 1/2008 | Hachiya | |
| 2006/0186867 A1 | 8/2006 | Kataoka | |
| 2007/0124615 A1 | 5/2007 | Orr | |

FOREIGN PATENT DOCUMENTS

WO    WO 2006046205    *  5/2006

OTHER PUBLICATIONS

Laurence McGarry, "The Standby Power Challenge" 2004 IEEE Asian Green Electronics Conference, pp. 56-62, 2004.
International Application No. PCT/US2009/045302, International Search Report dated Dec. 18, 2009, 4 pages.

* cited by examiner

*Primary Examiner* — Michael Rutland Wallis
(74) *Attorney, Agent, or Firm* — Holland & Hart LLP

(57) ABSTRACT

Methods, systems, and devices are described for auxiliary power with low standby power consumption. Switching power converters typically include a switching power element (e.g., a power transistor), driven by a switching controller (e.g., including a gate driver). The power output of the switching power converter may be a function of the switching signal provided by the switching controller. For example, a pulse-width modulated ("PWM") signal may be used to drive the switching power element, and the output of the switching controller may be adjusted by adjusting the frequency and/or duty cycle of the PWM signal. Embodiments implement cycle extension techniques to effectively extend a portion of the PWM signal to generate additional charge. The additional charge may be used to power an auxiliary power unit. The auxiliary power unit may then be used to drive the switching controller and/or to provide a source of power for other internal or external components.

25 Claims, 11 Drawing Sheets

POWER SUPPLY WITH STANDBY POWER

CROSS-REFERENCES

This application claims priority from U.S. Provisional Patent Application No. 61/056,109, filed May 27, 2008, entitled "POWER SUPPLY WITH STANDBY POWER", and from U.S. Provisional Patent Application No. 61/056,112, filed May 27, 2008, entitled "POWER SUPPLY WITH INTEGRATED SWITCHING DEVICE", both of which are hereby incorporated by reference, as if set forth in full in this document, for all purposes.

BACKGROUND

The present invention relates to power circuits in general and, in particular, to switching power supply circuits.

Many electronics applications use switching power supplies to convert mains line voltage (e.g., 110-volt, 60-hertz, AC voltage) to a desired application voltage (e.g., 12-volt, DC voltage). Typically, the switching power supply may perform the AC-to-DC conversion by using various controllers to control switching components. Because the controllers need power to operate, it may be necessary to keep them energized even when the application being powered is turned "off" by providing a so-called "standby" mode. The power consumed by the electronics application during its lowest power consumption mode (e.g., in its standby mode) is often called its "standby power" consumption.

In many applications, it may be desirable to reduce power consumption in standby mode, while being able to provide adequate power for consumption when turned "on." To accomplish this, some power supplies provide auxiliary power components. In standby mode, the power supplies may draw just enough power to energize a controller; but when "on," the power supply may feedback its output power into an auxiliary power circuit to maintain the controller.

A number of techniques are available in the art for providing auxiliary power. However, these techniques typically add cost and/or complexity to the circuit, for example by using relatively expensive power components like additional transformer windings. As such, it may be desirable to provide power supplies operable to generate auxiliary power with low standby power consumption.

SUMMARY

Among other things, methods, systems, and devices are described for auxiliary power with low standby power consumption. Switching power converters typically include a switching power element (e.g., a power transistor), driven by a switching controller (e.g., including a gate driver). The power output of the switching power converter may be a function of the switching signal provided by the switching controller. For example, a pulse-width modulated ("PWM") signal may be used to drive the switching power element, and the output of the switching controller may be adjusted by adjusting the frequency and/or duty cycle of the PWM signal. Some embodiments implement cycle extension techniques to effectively extend a portion of the PWM signal to generate additional charge. Other embodiments implement cycle truncation techniques to effectively steal charge from a portion of the PWM cycle to generate additional charge. In either type of embodiment, the additional charge may be used to power one or more auxiliary power units. The auxiliary power unit(s) may then be used to drive the switching controller and/or to provide sources of power for other internal or external components.

In one set of embodiments, a power supply is provided. The power supply includes a switching controller module, operable to generate a load switching signal and an auxiliary switching signal. The load switching signal includes pulses, each pulse of the load switching signal having a pulse width defining a charging duration, a first portion of the charging duration being defined as a function of an operational load power and a second portion of the charging duration being defined as a function of an operational auxiliary power. The auxiliary switching signal includes pulses, each pulse of the auxiliary switching signal having a pulse width defined by the second portion of the charging duration. The power supply further includes a load power module, communicatively connected with the switching controller module, and operable to generate output load power as a function of an input power signal and the load switching signal, such that the output load power is generated during the first portion of the charging duration; and an auxiliary power module, communicatively connected with the switching controller module, and operable to generate output auxiliary power as a function of the input power signal, the load switching signal, and the auxiliary switching signal, such that the output auxiliary power is generated during the second portion of the charging duration.

In another set of embodiments, a method is provided for supplying power. The method includes generating a charging cycle for a power converter module, the charging cycle having a charging duration; charging a first power subsystem during a first portion of the charging duration using the power converter module; charging a second power subsystem during a second portion of the charging duration using the power converter module; outputting an output load power using the first power subsystem; and outputting an output auxiliary power using the second power subsystem.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Among other things, systems, devices, and methods are described for providing auxiliary power with low standby power consumption.

Many electronics applications use power supplies to convert an input voltage to a desired application voltage compatible with the electronics application. For example, many power supplies convert mains line voltage (e.g., the 110-volt, 60-hertz, AC voltage available from many wall outlets) to a DC voltage for powering an appliance (e.g., 5 volts, 12 volts, etc.). In the past, linear power supplies often provided this conversion functionality by using lossy components, like transformers. For example, a 110-volt signal may be stepped down to five volts and rectified, with the excess power being dissipated as heat.

In many modern electronics applications, the linear power supplies have been replaced by switching power supplies. Switching power supplies may receive an input AC voltage, rectify and/or filter the voltage into a DC voltage, and use the DC voltage to control various controllers and switching components. The controllers and switching components may then be operable to generate a switched (e.g., pulse-width modulated) signal with a desired average power.

Figure 1:
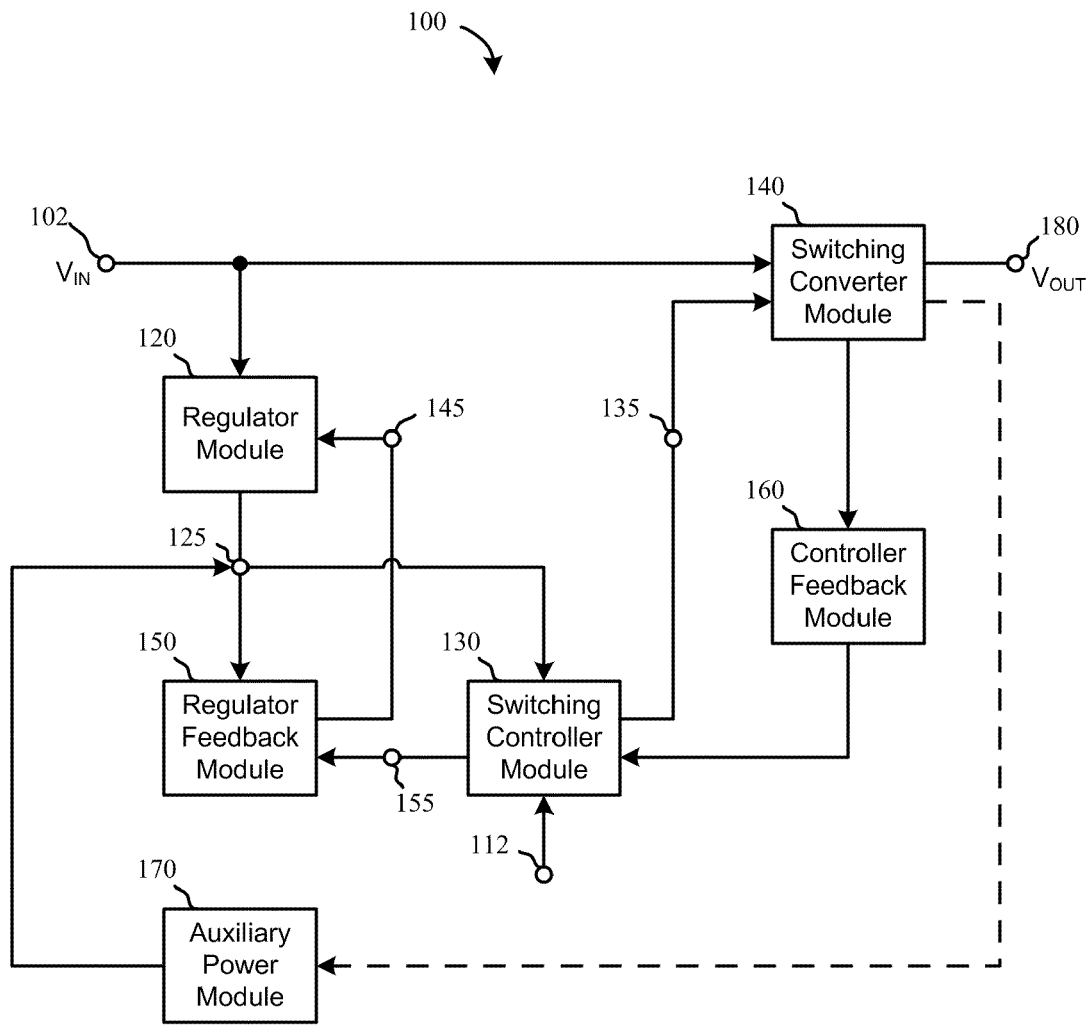
FIG. 1 shows a simplified block diagram of an illustrative switching power supply.

FIG. 1 shows a simplified block diagram of an illustrative switching power supply. The power supply 100 receives an input voltage 102 and generates a switched output voltage 180 with a desired average output power. The power supply 100 includes a regulator module 120, a switching controller module 130, and a switching converter module 140. In some embodiments, a voltage is received and rectified to generate the input voltage 102. Many types of rectifiers are known in the art, including full-wave and half-wave rectifiers. For example, a 110-volt AC voltage may pass through a full-wave rectifier to generate a substantially DC input voltage 102 of approximately 156 volts (i.e., 110×√2). In some cases, the DC signal may be filtered, transformed to a different voltage level, isolated, or otherwise processed.

The DC input voltage 102 is be passed to a regulator module 120, operable to provide and maintain power to the switching controller module 130. In some cases, the regulator module 120 includes a linear regulator (e.g., a depletion-mode transistor) configured in negative feedback through a regulator feedback module 150 (e.g., including an operational amplifier) to help provide a substantially constant source voltage to the switching controller module 130. The source voltage for the switching controller module 130 is illustrated as a controller source voltage terminal 125. Feedback from the regulator feedback module is received by the regulator module via an amplifier feedback terminal 145, as described more fully below.

The switching controller module 130 may be operable to control the switching converter module 140 when enabled. In standby mode, the switching controller module 130 may remain energized in anticipation of an enable signal 112 (e.g., an "on" signal from a remote control). When enabled, the switching controller module 130 may generate one or more switching signals. For example, the switching controller module 130 may generate switched signals at a gate driver terminal 135 for driving the gate of a switching device in the switching converter module 140.

When the switching controller module 130 is enabled, the switching converter module 140 may begin to operate to convert the DC input voltage 102 into the switched output voltage 180. Typically, the switching converter module 140 includes a switching device (e.g., a power-MOSFET), operable to use information from the switching controller module 130 (e.g., via gate driver terminal 135) to generate a pulse-width modulated ("PWM") signal. In some cases, the switching converter module 140 may be further configured as a buck controller, a boost controller, or any other type of controller. More detailed embodiments will be described below with reference to boost converters. However, it will be appreciated that the same inventive concepts may be used in many other types of converters.

In some embodiments of the power supply 100, the output voltage 180 (e.g., or other information, like current through the switching device in the switching converter module 140) is fed back to the switching controller module 130 through a controller feedback module 160. The controller feedback module 160 may operate to sense the average output voltage and feedback the information to the switching controller module 130 to maintain a desired average output voltage. For example, if feedback from the controller feedback module 160 indicates that the average voltage is too high, the switching controller module 130 may adjust the PWM duty cycle (e.g., and/or frequency) of the switching converter module 140 to bring the average voltage level back down.

It will be appreciated that, when turned "on," the operation of the switching power supply may be significantly more efficient than the operation of a comparable linear power supply. One reason may be that the devices in the switching converter module 140 may switch between their off and saturation regions, without much time in their less efficient linear regions. This may significantly reduce power consumption and heat generation of the power supply 100 during operation.

In some applications, it may be desirable to keep certain components energized even when the application is turned off. As such, the power supply 100 may have to provide power to certain components even when its output voltage 180 is at zero volts. For example, if a television is plugged into a wall outlet and turned "off," it may be desirable for the television to still be operable to receive a remote control signal to turn back "on." If all the components in the television were disabled (i.e., completely "off"), there may be no way for the television to receive remote control signals (e.g., via enable signal 112). Other examples include applications that continuously monitor their environment (e.g., refrigerators that maintain an internal thermostat even when the fan is off), applications that maintain signal reception capability (e.g., telephones, networks, remote controlled devices, etc.), applications with internal clocks, applications that maintain charged internal batteries, applications with continuous displays, etc.

To keep certain electronic components energized even when the output voltage 180 is "off," the power supply 100 may provide a "standby" mode. The power consumed in the standby mode (or in the lowest power consumption mode of an electronics application) may be called its "standby power" consumption. In many applications, it may be desirable to reduce standby power consumption, while still being able to provide adequate power for consumption when turned "on." To accomplish this, the power supply 100 may provide auxiliary power components. For example, in its standby mode, the power supply 100 may draw just enough power to energize its switching controller module 130 in anticipation of being enabled; but once it is enabled, the power supply 100 may feedback its output voltage 180 into an auxiliary power module 170 to maintain the switching controller module 130.

In some embodiments, the regulator module 120 and the auxiliary power module 170 are configured to support a startup mode for the power supply 100. For example, when the power supply 100 is completely off (e.g., unplugged, etc.), the input voltage 102 is substantially at zero volts. As such, there is insufficient voltage to maintain the regulator module 120, the switching controller module 130, the switching converter module 140, and/or other components of the power supply 100. When the power supply 100 starts up, it may be desirable to reliably start up in a particular sequence and/or with particular voltages. In some embodiments, during start-up, the regulator module 120 and the regulator feedback module 150 regulate the level seen at controller source voltage terminal 125 (i.e., the supply voltage level for the switching controller module 130) for proper operation.

Only after the switching controller module 130 stabilizes so as to be able to provide a reliable output, the switching controller module 130 activates the switching converter module 140 (e.g., by beginning to provide a switching signal via gate driver terminal 135). Thus, the output voltage 180 remains substantially at zero volts until the power supply 100 is capable of providing a stable and reliable output voltage 180. After the switching converter module 140 is activated, the auxiliary power module 170 may also become active. The auxiliary power module 170 may then be used to maintain the voltage level at controller source voltage terminal 125 without the regulator module 120. In some embodiments, after the auxiliary power module 170 takes over maintenance of the level at controller source voltage terminal 125, the regulator module 120 is disabled.

A number of techniques are available in the art for providing auxiliary power modules 170. However, these techniques typically add cost and/or complexity to the circuit. For example, some auxiliary power modules 170 use additional power components, like additional transformer windings and Schottky diodes.

Figure 2:
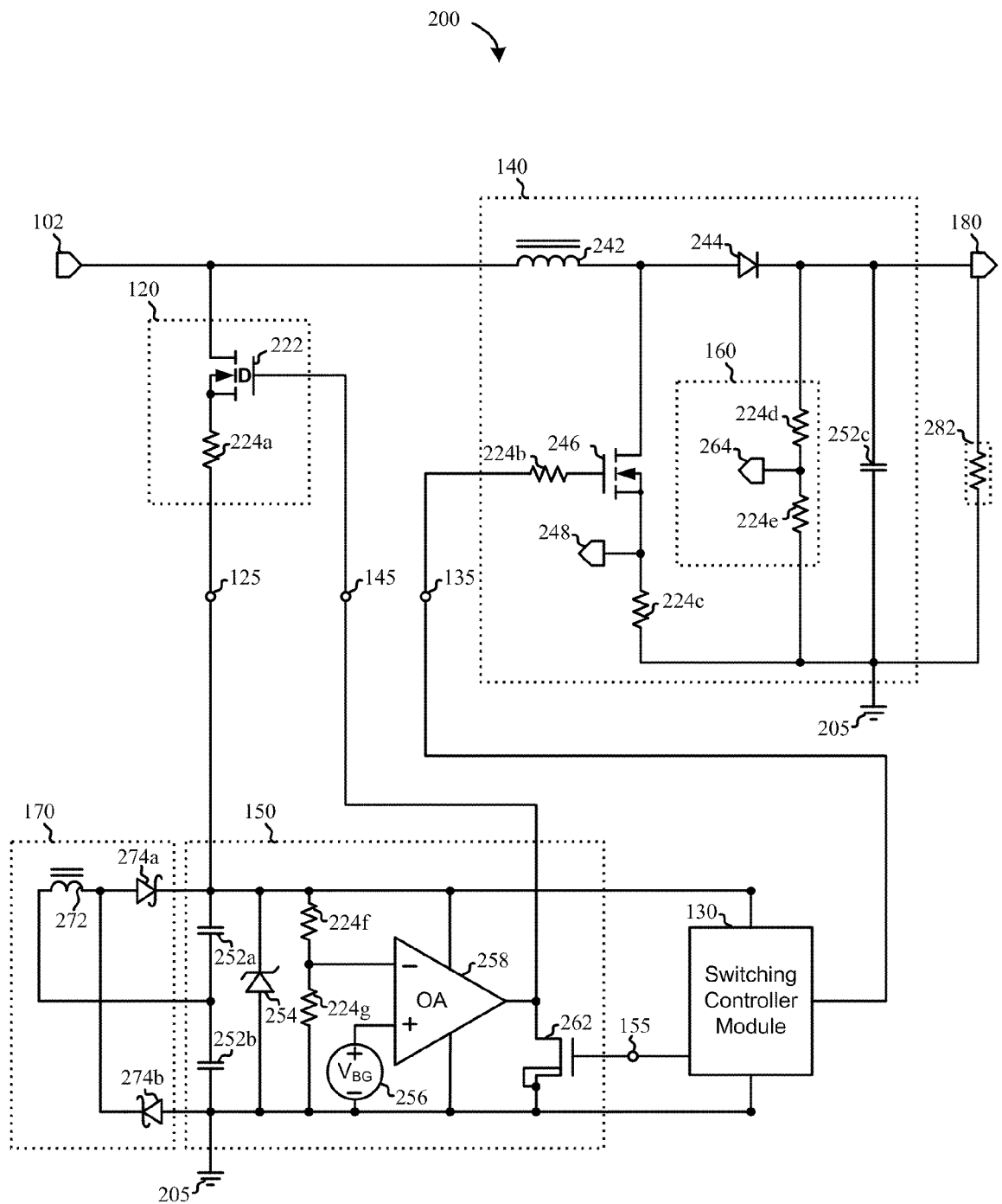
FIG. 2 shows a schematic diagram of an illustrative switching power supply with an auxiliary power unit.

FIG. 2 shows a schematic diagram of an illustrative switching power supply with an auxiliary power module, according to some prior art embodiments. The power supply 200 receives a rectified input voltage 102 and generates a switched output voltage 180 with desired characteristics (e.g., a desired average output voltage or out put power). The power supply 200 includes a regulator module 120, a switching controller module 130, a switching converter module 140, a regulator feedback module 150, a controller feedback module 160, and an auxiliary power module 170. These modules may be similar to the respective modules shown in FIG. 1. It is worth noting that circuit blocks have been surrounded by dashed lines for the sake of added clarity. However, it will be appreciated that various components in a circuit may be shared by several circuit blocks, making clear distinctions between circuit blocks difficult or even impossible. As such, the circuit block designations are intended merely to add clarity to the ensuing description, and should not be taken as limiting the scope of the invention.

The rectified input voltage 102 may be passed to the regulator module 120, operable to provide and maintain power to the switching controller module 130. The regulator module 120 includes a linear regulator 222, embodied as a depletion-mode power-MOSFET, and a resistor 224a in series with the source of linear regulator 222. Upon initial power-up, linear regulator 222 may provide start-up power by charging a controller source voltage terminal 125 from the high-voltage rectified input voltage 102. The controller source voltage terminal 125 is configured to provide a regulated source voltage to the switching controller module 130.

Resistor 224a is provided in series with the source of linear regulator 222 to limit the peak current drawn by linear regulator 222 during initial start-up (e.g., the inrush current). For example, resistor 224 de-biases the source of linear regulator 222 with respect to its gate terminal. The gate terminal of the linear regulator 222 is connected with an amplifier feedback terminal 145 coming from the output of an operational amplifier 258 in a regulator feedback module 150. During start-up, there may be insufficient voltage at the controller source voltage terminal 125 for reliable operation of operational amplifier 258, which may cause its output during start-up to be unpredictable. Resistor 224a may protect linear regulator 222 from any large spikes in current seen by linear regulator 222 as a result of undesirable output of operational amplifier 258 during start-up.

Further, the regulator feedback module 150 includes a capacitor 252a, configured at least to help maintain the level at the controller source voltage terminal 125, as described more below. Because capacitor 252a is connected with the controller source voltage terminal 125, large amounts of current may cause the capacitor 252a to charge too quickly. In some cases, this may shorten the life of capacitor 252a, or even cause permanent damage. As such, embodiments of resistor 224a are configured to limit the current seen at capacitor 252a to help prevent its charging too quickly. It will be appreciated that the series network of capacitor 252a and capacitor 252b can be evaluated for some purposes as a single capacitor, and that issues associated with capacitor 252a may also apply to capacitor 252b.

Further protection may be provided, in some embodiments of the regulator feedback module 150, by zener diode 254. Zener diode 254 may be configured to effectively clamp the voltage level at the controller source voltage terminal 125. This may help prevent the voltage from exceeding a maximum rated voltage for components of the regulator feedback module 150 and/or the switching controller module 130, for example during start-up.

The regulator feedback module 150 also includes a resistor divider network, having resistor 224f and resistor 224g. The node at which resistor 224f and resistor 224g are connected is also connected with an inverting input of operational amplifier 258. The non-inverting input of operational amplifier 258 may monitor a stable reference level provided by a voltage source 256. In one embodiment, the voltage source 256 provides a stable bandgap reference level of approximately 1.25 volts. The ratio of resistor 224f to resistor 224g may be chosen so that in negative closed loop feedback, a desired level is maintained at the controller source voltage terminal 125 (e.g., a regulated 12-volt supply voltage is maintained for the switching controller module 130).

For example, when the power supply 200 first starts up, the voltage at the node between resistor 224f and resistor 224g is less than the reference level provided by voltage source 256.

In this condition, the level at the amplifier feedback terminal 145 may be substantially pegged to the level at the controller source voltage terminal 125. Current regulated by the regulator module 120 charges capacitor 252a, and the level at the controller source voltage terminal 125 rises.

After some time, the voltage across capacitor 252a (e.g., and therefore, the level seen at the controller source voltage terminal 125) reaches the desired source voltage level ("$V_{CC}$") for the switching controller module 130. The voltage at the node between resistor 224f and resistor 224g may substantially reach the reference level provided by the voltage source 256, causing operational amplifier 258 to begin adjusting the level seen at the amplifier feedback terminal 145. Because the amplifier feedback terminal 145 is configured to control the gate of linear regulator 222, changing the level at the controller source voltage terminal 125 affects the amount of current flowing through linear regulator 222.

This may effectively regulate the charging of capacitor 252a, thereby regulating the level at the controller source voltage terminal 125. In this way $V_{CC}$ may be regulated in negative feedback. As such, these components may provide a regulator feedback module 150, operable to control the level at the amplifier feedback terminal 145 to maintain $V_{CC}$ at a desired level. This may, in turn, help provide a regulated source voltage to the switching controller module 130 and/or any components connected with the controller source voltage terminal 125.

It will be appreciated by those of skill in the art that using linear regulator 222 in the regulator module 120 may be typical because of the simplicity of the circuit, but may also be inefficient. For example, if the rectified input voltage 102 is approximately 160 volts, and the desired $V_{CC}$ for the switching controller module 130 is 12 volts, the regulator module 120 must drop approximately 148 volts. Even if the current requirements for the power supply 200 are around one milliamp (which may typically be a low value for many applications), the regulator module 120 may dissipate around 148 milliwatts (i.e., 148 volts times one milliamp). In some cases, regulatory requirements may set power consumption limits for power supplies to only 100 milliwatts, causing the regulator module 120, by itself, to exceed certain power regulations.

It may be desirable, therefore, to limit the use of linear regulator 222 in the regulator module 120 only to the standby and/or start-up mode. During the standby mode, the power supply 200 may dissipate very small amounts of power relative to when it is "on," as the components may only have to consume just enough power to remain ready (e.g., for an enable signal). For example, the power supply 200 may dissipate only in the microwatt range when in its standby mode.

To avoid using linear regulator 222 to provide power to the controller during operation, the power supply 200 may instead draw power from the auxiliary power module 170 during normal (e.g., "on") operation. The auxiliary power module 170 may be operable to feed power back from the switching converter module 140 to use as power for maintaining the switching controller module 130. In that way, linear regulator 222 may be shut down or bypassed, such that it dissipates little or no power once the auxiliary power module 170 takes over.

Figure 3:
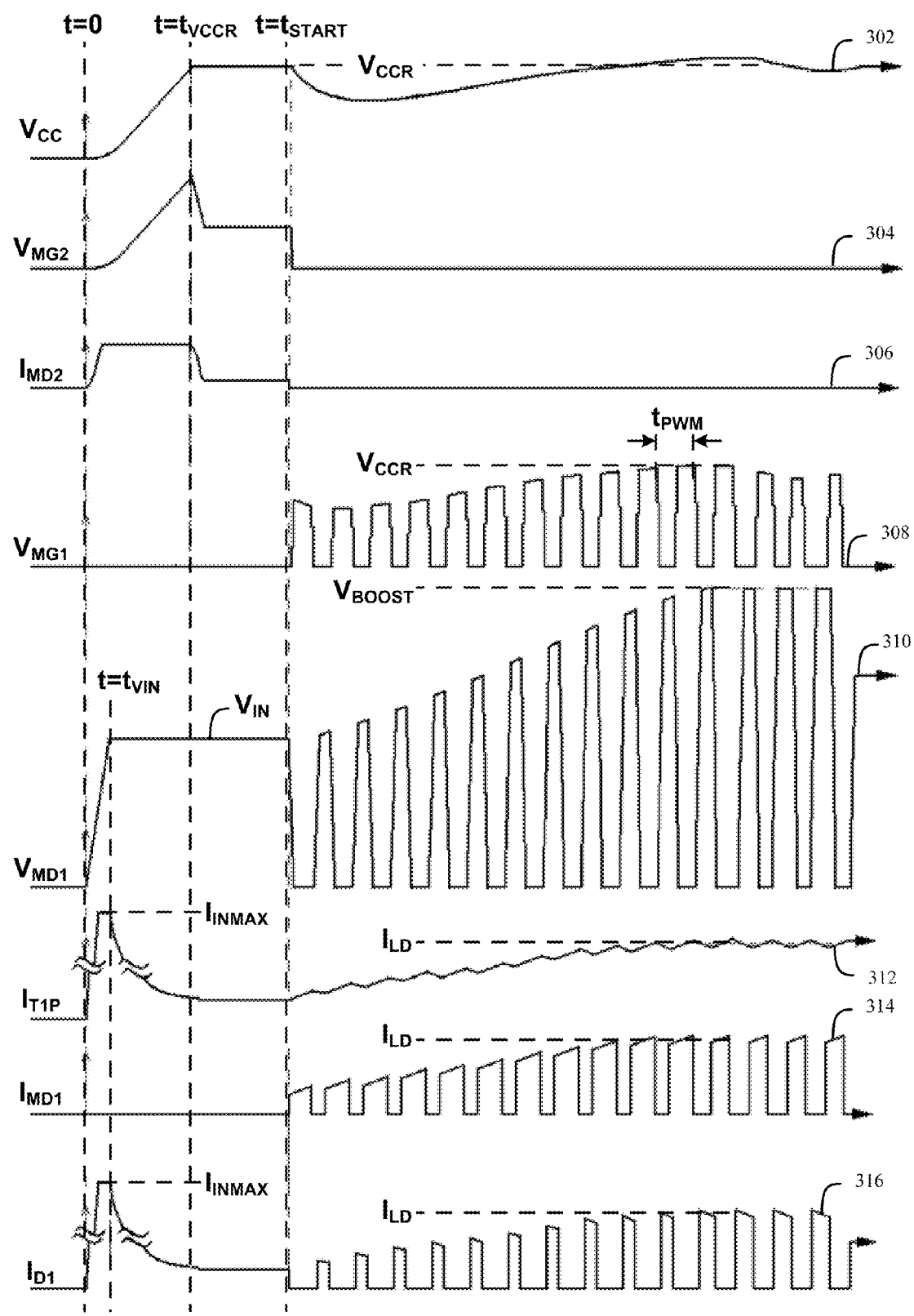
FIG. 3 provides an illustrative set of waveforms taken at various points in the power supply circuit of FIG. 2.

To better understand the operation of the power supply 200 in its various modes (e.g., standby versus normal operation), it may be helpful to examine waveforms at various locations in the power supply 200 circuit at various times. FIG. 3 provides an illustrative set of waveforms taken at various points in the power supply 200 circuit of FIG. 2. In certain instances, the waveforms may be simplified or idealized to add clarity, and should be taken merely as illustrative examples.

As illustrated, prior to some initial time (e.g., t=0), the power supply 200 is not plugged in, so the rectified input voltage 102 is at zero volts. At an initial time (e.g., t=0), the power supply 200 is plugged in, the rectified input voltage 102 jumps up to some level (e.g., around 160 volts), and the controller source voltage terminal 125 begins to ramp up to a desired $V_{CC}$ level, as described above and as shown in the first graph 302 of FIG. 3. The desired $V_{CC}$ level is denoted as "$V_{CCR}$" (e.g., the regulated $V_{CC}$ level). During this same start-up period, the gate voltage of linear regulator 222, the level at the amplifier feedback terminal 145, also ramps up to $V_{CCR}$, as shown in the second graph 304 of FIG. 3. This may cause the current through linear regulator 222 to shoot up to some level (e.g., as limited by the rated current of the device, and by resistor 224a in series with the source of linear regulator 222), as shown in the third graph 306 of FIG. 3.

Effectively, at start-up, the rectified input voltage 102 is applied directly to one end of a transformer primary 242 (the primary side of a transformer), causing current to flow through the transformer primary (denoted "$I_{TIP}$"), as shown in the sixth graph 312 of FIG. 3. As such, substantially the input voltage 102 will be applied to the drain of power switching device 246 (e.g., a power MOSFET), which is connected to the other side of the transformer primary 242. The gate of power switching device 246 so that power switching device 246 is OFF during startup, causing the drain of power switching device 246 to be pulled up substantially to the input voltage 102 level, as shown in the fifth graph 310 of FIG. 3. For example, a gate driver terminal 135 is controlled by the switching controller module 130 to be substantially at zero volts, thereby holding the gate voltage of power switching device 246 at substantially zero volts, as shown in the fourth graph 308 of FIG. 3).

Diode 244 is connected with its anode connected to the drain of power switching device 246 and the second side of the transformer primary 242. As such, diode 244 may be initially forward biased into conduction, thereby allowing the $I_{TIP}$ current to flow through it, as shown in the eighth graph 316 of FIG. 3. This may cause a load capacitor 252c, connected between the cathode of diode 244 and ground, to be charged at a maximum rate limited by the current limit of the source of the rectified input voltage 102 (denoted "$I_{INMAX}$") less effects of diode 244. At some time, the circuit stabilizes, such that the drain of power switching device 246 and the anode of diode 244 are both charged substantially to the rectified input voltage 102.

Meanwhile, at some time t=$t_{CCR}$, the level at the controller source voltage terminal 125 ($V_{CC}$), and the level at the amplifier feedback terminal 145 (the gate voltage of linear regulator 222), both substantially reach $V_{CCR}$. The regulator feedback module 150 may begin regulating $V_{CC}$ (e.g., in negative feedback, as described above) to maintain $V_{CC}$ substantially at $V_{CCH}$. This may cause the gate voltage of linear regulator 222 and the current through linear regulator 222 to drop, as shown in the second graph 304 and the third graph 306 of FIG. 3, respectively. At this point in this illustrative case, the power supply 200 remains in a standby mode, waiting for an enable signal.

At some later time, t=$t_{STRT}$ (e.g., after the power supply 200 has entered a stable standby mode), an enable signal 112 is sent to the switching controller module 130, directing the switching controller module 130 to begin driving the switching converter module 140 to supply a switched output voltage 180. The switching controller module 130 begins driving the gate voltage of the power switching device 246 (e.g., by changing the level on the gate driver terminal 135) with a PWM signal, as shown in the fourth graph 308 of FIG. 3.

Operation of the switching converter 240 may then commence to output the desired output voltage 180. For example, as current builds in the transformer primary 242, the voltage across load capacitor 252c (e.g., essentially the drain voltage of power switching device 246 less the voltage drop across diode 244) may increase. In the boost converter configuration shown in FIG. 2, the voltage may increase to some boost voltage level (denoted "$V_{BOOST}$"), as shown in the fifth graph 310 of FIG. 3.

At substantially the same time, a signal may be output by the switching controller module 130 to the regulator feedback module 150 via an AUX OFF terminal 155. The AUX OFF terminal 155 drives the gate voltage of a switch 262 (e.g., an N-channel enhancement-mode transistor). By applying a voltage level to the AUX OFF terminal 155, the switch 262 is turned ON, effectively shorting the output of operational amplifier 258 to ground 205. This may effectively drive the gate voltage of linear regulator 222 (the level at the amplifier feedback terminal 145) to zero, thereby driving the current through linear regulator 222 substantially to zero, as shown in the second graph 304 and the third graph 306 of FIG. 3, respectively. As such, the regulator module 120 is effectively disabled after the switching converter module 140 enters normal operation.

Notably, once the regulator module 120 is disabled, the voltage at the controller source voltage terminal 125 may begin to drop, as shown in the first graph 302 of FIG. 3. As shown in FIG. 2, the auxiliary power module includes a winding that is a transformer secondary (e.g., a secondary winding of a transformer) of the same transformer from which the transformer primary 242 is used in the switching converter module 140. Thus, as power switching device 246 switches, current begins to build up in the transformer primary 242, which may induce a voltage across the transformer secondary 272 in the auxiliary power module 170.

The auxiliary power module 170 includes Schottky diode 274a and Schottky diode 274b. One end of the transformer secondary 272 is connected to a node between capacitor 252a (i.e., the side of capacitor 252a not connected with the controller source voltage terminal 125) and capacitor 252b, which is connected to ground. The other end of the transformer secondary 272 is connected with the anode of Schottky diode 274a and the cathode of Schottky diode 274b. The cathode of Schottky diode 274a is connected with the controller source voltage terminal 125, and the anode of Schottky diode 274b is connected with ground 205. In this configuration (e.g., in the voltage doubler configuration), charge induced in the transformer secondary 272 can be effectively used to maintain charge on capacitor 252a, thereby maintaining regulation of the controller source voltage terminal 125 substantially at $V_{CCR}$.

Notably, other components may be used to further regulate the power supply 200. In one embodiment, as shown in FIG. 2, a current-sensing resistor 224c is connected between the source of power switching device 246 and ground 205. The voltage across resistor 224c is proportional to the current flowing through power switching device 246, and may, therefore, be used as a current feedback signal 248 to regulate the current through the power switching device 246. Additionally, in one embodiment, a resistor divider network is connected between the output voltage 180 and ground 205, having resistor 224d and resistor 224e. The voltage at the node between resistor 224d and resistor 224e is proportional to the output voltage 180, and may, therefore, be used as a voltage feedback signal 264 to regulate the output voltage 180. For example, the current feedback signal 248 and/or the voltage feedback signal 264 may be communicated back to the switching controller module 130, which may, in turn, regulate the signal applied to the gate driver terminal 135 accordingly (e.g., by adjusting the duty cycle or frequency of the PWM signal).

It will be appreciated that, while in standby mode, the less efficient linear regulator may be used to power the switching controller module 130. However, shortly after the switching controller module 130 is enabled (e.g., via enable signal 112), the linear regulator may be disabled, and the switching controller module 130 may be powered by induced feedback from the switching converter module 140 via the auxiliary power module 170.

While switching off the regulator module 120 may provide increases in efficiency of the power supply 200, the configuration of the auxiliary power module 170 may still pose certain limitations. One limitation may be that the auxiliary windings in the auxiliary power module 170 and other components may increase the complexity and/or cost of the power supply. For example, a typical one-winding inductor of certain topologies may have to be converted into a two-winding transformer, or a two-winding topology may have to be converted to a three-winding transformer. Another limitation may be that the auxiliary power module 170 configuration shown in FIG. 2 uses multiple Schottky diodes 274 and capacitors 252. This may further increase the cost and/or complexity of the auxiliary power module 170 circuit. Still another limitation is that the auxiliary output voltage may be limited to some discrete ratio between itself and the switched output voltage 180 (e.g., $V_{BOOST}$), due to the discrete nature of the transformer winding ratios.

For these and/or other reasons, it may be desirable to provide power supplies with auxiliary power and low standby power consumption, while avoiding the limitations that may be inherent in using the auxiliary winding and other components of auxiliary power modules, like the auxiliary power module 170 of FIG. 2. Embodiments of the invention employ cycle extension and/or cycle truncation techniques for providing power supplies with auxiliary power and low standby power consumption. Embodiments using cycle extension techniques are described in more detail below with reference to FIGS. 4-7, and embodiments using cycle truncation techniques are described in more detail below with reference to FIGS. 8-11.

Embodiments Using Cycle Extension

Figure 4:
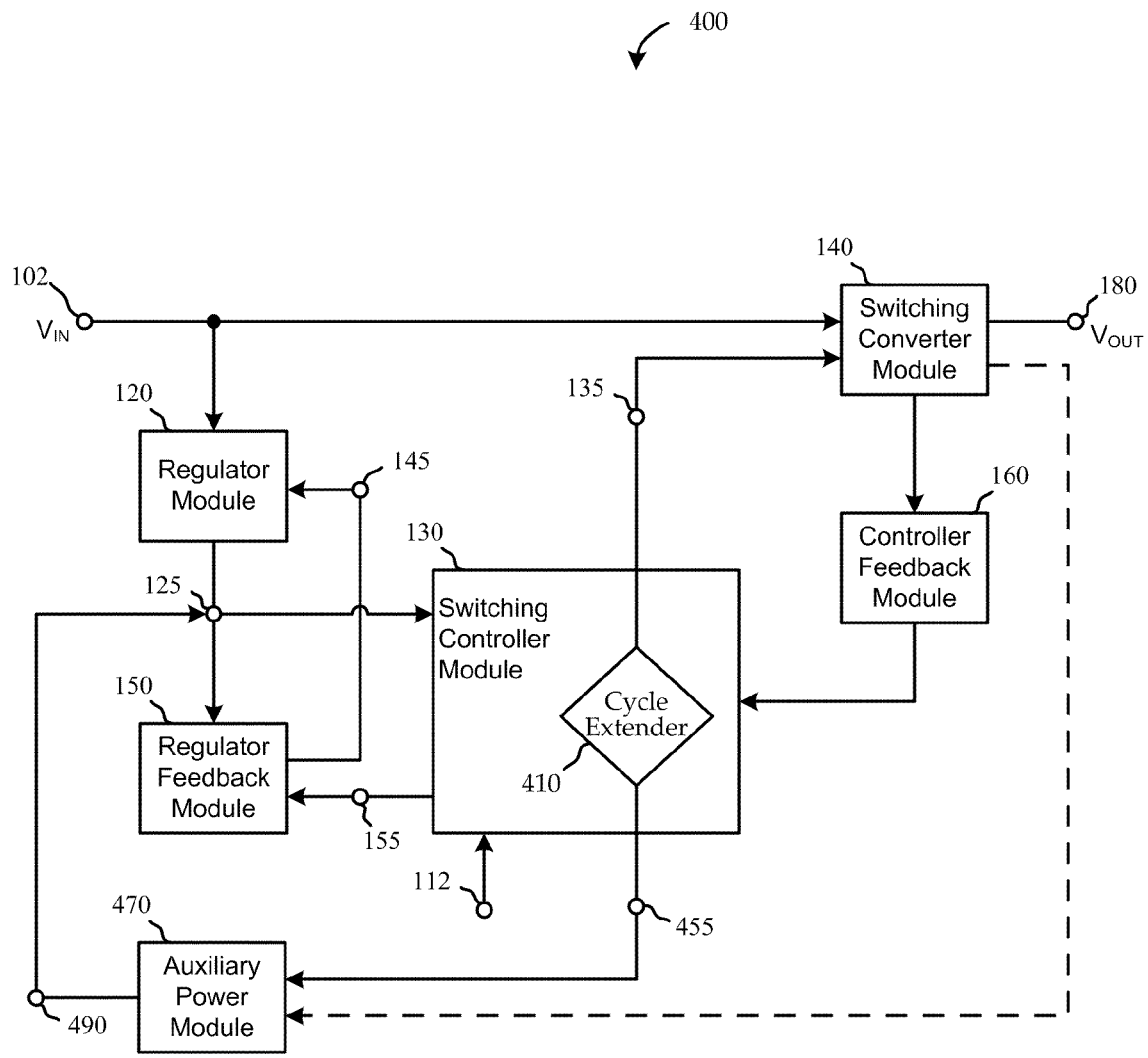
FIG. 4 shows a simplified block diagram of a system for generating auxiliary power using cycle extension techniques, according to various embodiments of the invention.

FIG. 4 shows a simplified block diagram of a power supply 400 for generating auxiliary power using cycle extension techniques, according to various embodiments of the invention. The power supply 400 receives an input voltage 102 and generates a switched output voltage 180 with a desired average output power. The power supply 400 includes a regulator module 120, a switching controller module 130, a switching converter module 140, and an auxiliary power module 470. The switching controller module 130 includes a cycle extender module 410. In some embodiments, a voltage is received and rectified to generate the input voltage 102, as described with reference to FIG. 1.

In some embodiments, the cycle extender module 410 in the switching controller module 130 generates a switching control signal at a gate driver terminal 135 for controlling the switching converter module 140. The switching converter module 140 may then convert the switching control signal to a charging cycle. In certain embodiments, the switching converter 140 includes a low-voltage switching device. Using a low-voltage device may allow some or all of the switching converter module 140 to be integrated with the switching controller module 130 (e.g., in the same integrated circuit).

In certain embodiments, the charging cycle is a PWM cycle with a duty cycle that defines an "on" duration and an "off" duration. During the "on" duration, one or more charge subsystems (e.g., an inductor or a capacitor) may charge. During the "off" cycle, the charge subsystem or subsystems may partially or completely discharge stored energy to one or more generator subsystems, including the switching converter module 140, and one or more auxiliary power modules 470. Embodiments of the cycle extender module 410 extend the charging cycle, such that a portion of the charging cycle is directed to providing energy to one or more switching converter modules 140 (e.g., load power generators), and one or more other portions of the charging cycle are directed to providing energy to an auxiliary power module 470 (e.g., a generator for an auxiliary load, for maintaining controller power, etc.). It is worth noting that, by using the charging cycle to charge the auxiliary power module 470, embodiments avoid energy loss due to "ON resistance" of the main switch in the switching converter modules 140 (e.g., the resistance of switching device 246 shown in FIG. 5 when the device is ON).

In start-up or standby mode, the input voltage 102 is passed to the regulator module 120, which may be operable to provide and maintain power to the switching controller module 130. In some embodiments, this functionality is substantially identical to the functionality described with reference to FIG. 1. Particularly, in some embodiments, the regulator module 120 includes a linear regulator (e.g., a depletion-mode transistor) configured in negative feedback through a regulator feedback module 150 (e.g., including an operational amplifier) to help provide a substantially constant source voltage to the switching controller module 130 at a controller source voltage terminal 125. Feedback from the regulator feedback module 150 is received by the regulator module 120 via an amplifier feedback terminal 145.

The switching controller module 130 may be operable to control the switching converter module 140 when enabled. In standby mode, the switching controller module 130 may remain energized in anticipation of an enable signal 112 (e.g., an "on" signal from a remote control). When enabled, the switching controller module 130 may generate one or more switching signals. For example, the switching controller module 130 may generate switched signals at a gate driver terminal 135 for driving the gate of a switching device in the switching converter module 140.

When the switching controller module 130 is enabled, the switching converter module 140 may begin to operate to convert the DC input voltage 102 into the switched output voltage 180. Typically, the switching converter module 140 includes a switching device (e.g., a MOSFET), operable to use information from the switching controller module 130 (e.g., via gate driver terminal 135) to generate a pulse-width modulated ("PWM") signal. In some embodiments, the output voltage 180 (e.g., or other information, like current through the switching device in the switching converter module 140) is fed back to the switching controller module 130 through a controller feedback module 160 to regulate the output of the switching converter module 140.

In some embodiments, the cycle extender module 410 in the switching controller module 130 extends the PWM signal controlling the switching converter module 140, effectively creating a longer PWM signal (i.e., having a lengthened "on" duration) for charging a first charge subsystem. The lengthened (i.e., added) portion of the "on" duration may then be redirected to charge a second charge subsystem. The energy stored by the first charge subsystem may then be converted for use by the switching converter module 140 and the energy stored by the second charge subsystem may then be converted for use by the auxiliary power module 470.

In certain embodiments, auxiliary power generated by the auxiliary power module 470 is recycled to maintain source power for components of the switching controller module 130. In these embodiments, the regulator module 120 may be disabled once the auxiliary power module 470 begins regulating the level at the controller source voltage terminal 125. Embodiments of the cycle extender module 410 control the charging cycle (e.g., and the effective extension of the charging cycle) via signals at the gate driver terminal 135 and an auxiliary control terminal 455.

Figure 5:
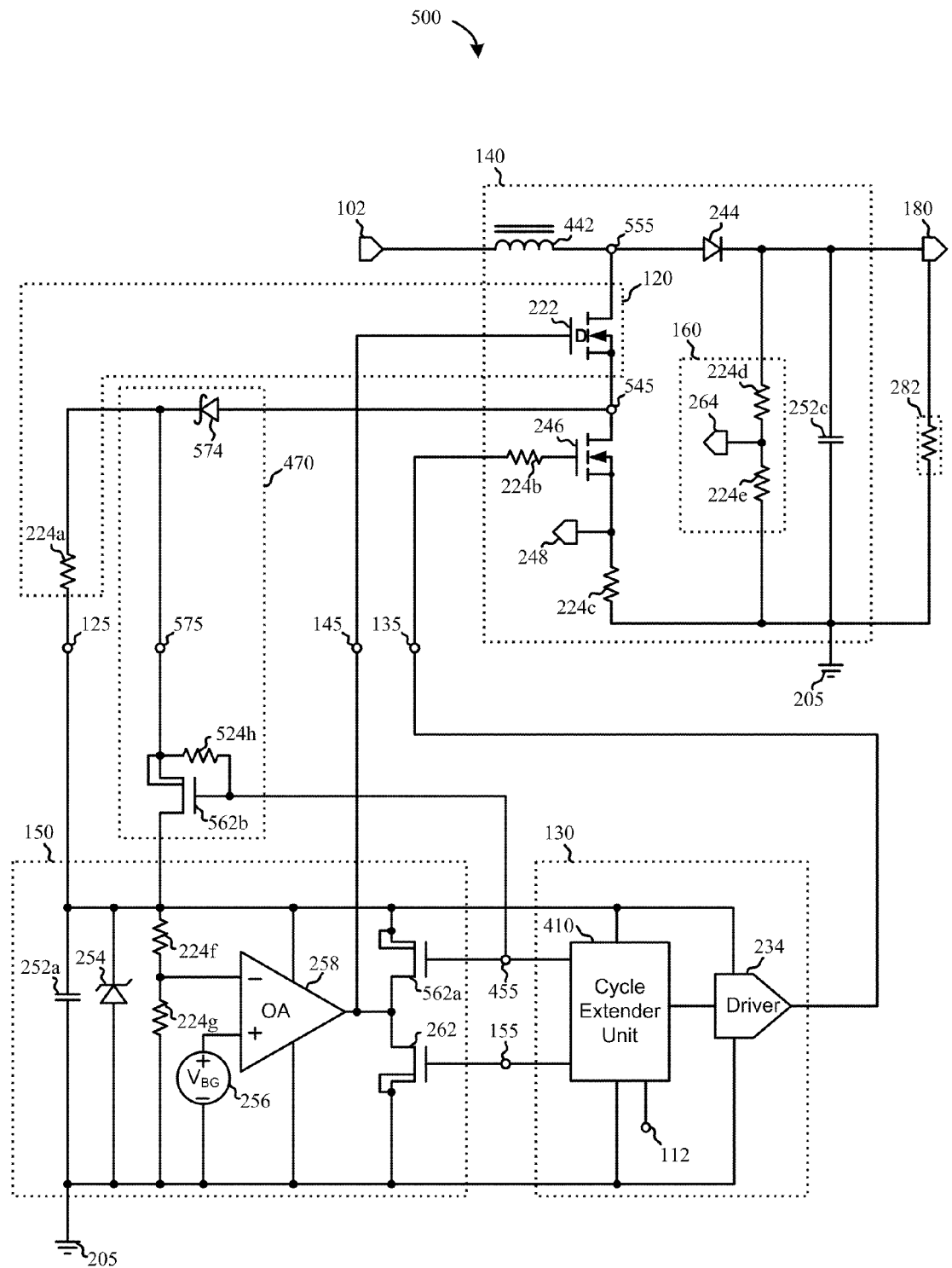
FIG. 5 shows a schematic diagram of a switching power supply that provides auxiliary power using an embodiment of the system of FIG. 4, according to various embodiments of the invention.
Figure 6:
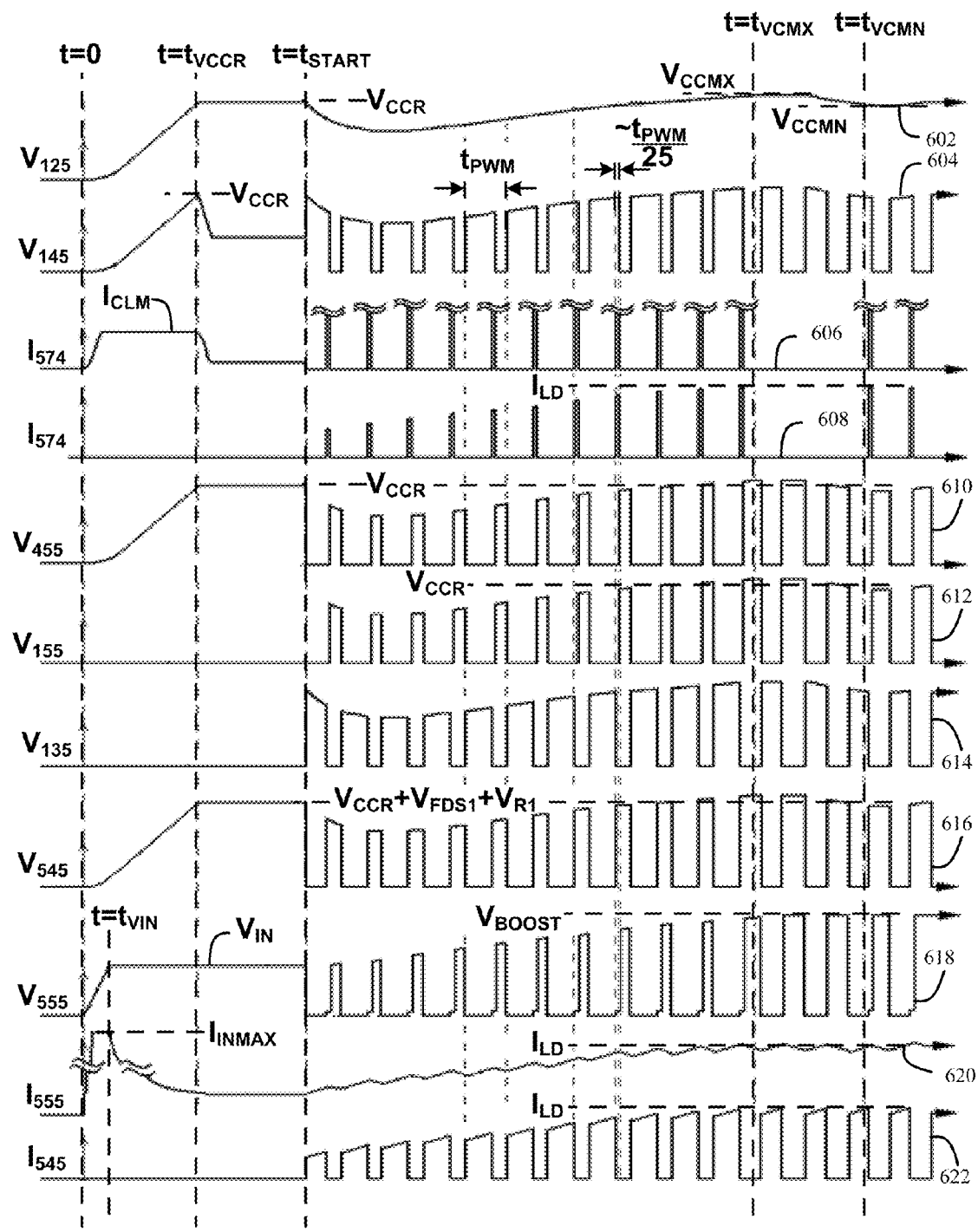
FIG. 6 provides an illustrative set of waveforms taken at various points in the power supply of FIG. 5.

It will be appreciated by those of skill in the art that there are a number of ways to implement the power supply 400. Further, it will be appreciated that, in some embodiments, the power supply 400 is part of a larger system, like a power management system. FIG. 5 shows a schematic diagram of a switching power supply 500 that provides auxiliary power using an embodiment of the power supply 400 of FIG. 4, according to various embodiments of the invention. FIG. 6 provides an illustrative set of waveforms taken at various points in the power supply 500 of FIG. 5. For added clarity, FIGS. 5 and 6 will be described in parallel.

The power supply 500 receives an input voltage 102 and generates a switched output voltage 180 with a desired characteristic (e.g., an average output voltage or power). The power supply 500 includes a regulator module 120, a switching controller module 130, a switching converter module 140, a regulator feedback module 150, a controller feedback module 160, and an auxiliary power module 470. Notably, unlike the power supply 200 in FIG. 2, the power supply 500 of FIG. 5 is shown with no transformer secondary (e.g., transformer secondary 272 of FIG. 2), fewer capacitors (e.g., capacitor 252*b* of FIG. 2 is absent), and only one Schottky diode (e.g., as opposed to FIG. 2, which includes Schottky diode 274*a* and Schottky diode 274*b*).

The rectified input voltage 102 is passed to the regulator module 120 (e.g., through an inductor 542 in the switching converter module 140), operable to provide and maintain power to the switching controller module 130 (e.g., at least in standby or start-up modes). The regulator module 120 includes a linear regulator 222, embodied as a depletion-mode power-MOSFET, and a resistor 224*a* in series with the source of linear regulator 222. Upon initial power-up, linear regulator 222 may provide start-up power by charging terminal 125 from the high-voltage rectified input voltage 102. Terminal 125 is configured to provide a regulated source voltage to the switching controller module 130.

Resistor 224*a* is provided in series with the source of linear regulator 222 to limit the peak current drawn by linear regulator 222 during initial start-up (e.g., the inrush current). For example, resistor 224*a* de-biases the source of linear regulator 222 with respect to its gate terminal. The gate terminal of the linear regulator 222 is connected with terminal 145 coming from the output of an operational amplifier 258 in the regulator feedback module 150. During start-up, there may be insufficient voltage at terminal 125 for reliable operation of operational amplifier 258, which may cause its output during start-up to be unpredictable. Resistor 224*a* may protect linear regulator 222 from any large spikes in current seen by linear regulator 222 as a result of undesirable output of operational amplifier 258 during start-up.

As shown, the drain of linear regulator 222 is coupled with the intersection of inductor 542 and diode 244, shown as terminal 555 on the switched side of inductor 542. In some embodiments, inductor 542 is implemented as one side of a transformer (e.g., transformer primary 242 of FIG. 2); while in other embodiments, inductor 542 is implemented as an inductor or other similarly functional component. The source of linear regulator 222 is connected with the drain of switching device 246 (e.g., shown as part of the switching converter module 140) and the anode of Schottky diode 574 (e.g., shown as part of the auxiliary power unit 470) at terminal 545. It will be appreciated that, with switching device 246 and linear regulator 222 effectively in series from the perspective of current flow through switching device 246 (e.g., or through terminal 545), switching device 246 may be implemented as a low-voltage device (i.e., linear regulator 222 may be used to withstand voltage and power levels exceeding the rating of switching device 246).

The regulator feedback module 150 may further include a capacitor 252a, configured at least to help maintain the level at the controller source voltage terminal 125, as described more below. Because capacitor 252a is connected with terminal 125, large amounts of current may cause the capacitor 252a to charge too quickly. In some cases, this may shorten the life of capacitor 252a, or even cause permanent damage. As such, embodiments of resistor 224a are configured to limit the current seen at capacitor 252a to help prevent its charging too quickly. Further, it will be appreciated by those of skill in the art that, in this configuration, Schottky diode 574 may prevent undesirable discharging of capacitor 252a. Further protection may be provided, in some embodiments of the regulator feedback module 150, by zener diode 254. Zener diode 254 may be configured to effectively clamp the voltage level at terminal 125. This may help prevent the voltage from exceeding a maximum rated voltage for components of the regulator feedback module 150 and/or the switching controller module 130, for example during start-up.

The regulator feedback module 150 also includes a resistor divider network, having resistor 224f and resistor 224g. The node at which resistor 224f and resistor 224g are connected is also connected with an inverting input of operational amplifier 258. The non-inverting input of operational amplifier 258 may monitor a stable reference level provided by a voltage source 256. In one embodiment, the voltage source 256 provides a stable bandgap reference level of approximately 1.25 volts. The ratio of resistor 224f to resistor 224g may be chosen so that in negative closed loop feedback, a desired level (e.g., "$V_{CC}$") is maintained at terminal 125 (e.g., a regulated 12-volt supply voltage is maintained for the switching controller module 130).

It will be appreciated that, in its startup and standby modes, the power supply 500 may operate substantially similarly to the power supply 200 of FIG. 2. This may be illustrated by the fact that, in the startup and standby regions, the first graph 302, the second graph 304, the third graph 306, the fourth graph 308, the fifth graph 310, the sixth graph 312, and the seventh graph 314 of FIG. 3 are substantially identical to the first graph 602, the second graph 604, the third graph 606, the seventh graph 614, the ninth graph 618, the tenth graph 620, and the eleventh graph 622 of FIG. 6, respectively. It is worth noting that, because of differences in the circuit configurations of FIG. 2 and FIG. 5, some of the same waveforms are actually seen corresponding to different components in FIG. 3 and FIG. 6. For example, the third graph 306 of FIG. 3 shows the current through linear regulator 222, while the third graph 606 of FIG. 6 shows a substantially identical startup and standby waveform for the current through Schottky diode 574.

In normal operation, the power supply 500 may operate significantly differently from the power supply 200 of FIG. 2. At $t=t_{STRT}$, a first PWM cycle is started by driving the gate voltages of linear regulator 222 and switching device 246 HIGH (e.g., to turn them ON and allow current to flow), as shown in the second graph 604 and seventh graph 614 of FIG. 6, respectively. The gate of switching device 246 is driven by the level at terminal 135, which may be controlled by a gate driver 234 and a cycle extender unit 410 in the switching controller module 130. The gate of linear regulator 222 is driven by the level at terminal 145, which may be controlled by switch 262 and switch 562a.

Switch 262 is controlled by terminal 155 and switch 562 is controlled by terminal 455. For example, in start-up mode, terminal 155 may be LOW (e.g., to turn OFF n-channel switch 262), and terminal 455 may be HIGH (e.g., to turn OFF p-channel switch 562a). By turning both switch 262 and switch 562a OFF, the output of operational amplifier 258 may be used to control the level at terminal 145 in feedback, as desired. Embodiments of the cycle extender module 410 control the levels at terminal 455 and at terminal 135, so as to effectively switch linear regulator 222 and switching device 246 as two independent switching devices.

To drive the gate of linear regulator 222 HIGH (e.g., to drive the level at terminal 145 to a HIGH level), the cycle extender module 410 may drive terminal 455 to a LOW level, causing switch 562a to turn ON, thereby pulling the level at terminal 145 substantially to the level at terminal 125 (e.g., "$V_{CC}$"). Turning ON both linear regulator 222 and switching device 246 may initiate current flow though inductor 542 and switching device 246, as shown in the tenth graph 620 and the eleventh graph 622 of FIG. 6, respectively. It is worth noting that if switching device 246 and linear regulator 222 are switched on and off at exactly the same time, a full PWM cycle of switching device 246 (e.g., and consequently, of linear regulator 222) would be used for the charging cycle (e.g., which may be similar to the operation of the power supply 200 of FIG. 2).

When the level at terminal 125 drops below a desired regulated level ("$V_{CCR}$"), the PWM cycle for linear regulator 222 may be extended by the cycle extender module 410 past the PWM cycle for switching device 246 by some $t_{PWM}/K$. The value of K may be selected for a maximum expected auxiliary power required by the switching converter module 140. For example, K=25 may imply that the auxiliary power requirement is approximately 4% of the total expected power output of the switching converter module 140, which may typically be considered marginally acceptable. In other examples, K=50 may imply an approximate 2% auxiliary power requirement, while K=200 may imply an approximate 0.5% auxiliary power requirement.

Switching device 246 may be turned off at the end of each switching device 246 PWM cycle, and linear regulator 222 may remain on for the extended duration of its linear regulator 222 PWM cycle (e.g., the extra ½5th of the switching device 246 PWM cycle, where K=25). This may be implemented by using the cycle extender unit 410 to drive terminal 135 LOW at the end of each switching device 246 PWM cycle (e.g., via gate driver 234), and to hold terminal 455 LOW for the extended duration of the linear regulator 222 PWM cycle, before ultimately driving terminal 455 HIGH for the remainder (e.g., the non-extended portion) of the PWM cycle.

It is worth noting that terminal 455 is connected both to switch 562a, as described above, and to switch 562b, which is shown as part of the auxiliary power module 470. As such, both switch 562a and switch 562b will be ON at substantially the same time. When switching device 246 turns OFF and linear regulator 222 remains on (e.g., in the extended portion of the PWM cycle), Shottkey diode 574 may become forward biased, allowing current to flow. Because switch 562b will be ON at that time, as described above, and switch 562b is in parallel with resistor 224a of the regulator module 120, switch 562b may effectively provide a shunt current path that bypasses resistor 224a. This may cause current to be dumped into terminal 125, thereby recharging capacitor 252a. In this way, the extended portion of the PWM cycle may be used to generate auxiliary power for maintaining a proper voltage level on terminal 125, and thus maintain operation of the switching controller module.

For example, when the signal shown in the fifth graph 610 of FIG. 6 (i.e., the voltage at terminal 455) goes HIGH, linear regulator 222 may turn ON, thereby effectively shorting resistor 224a, and causing the current through Shottkey diode 574 to now be limited only by what was flowing through switching device 246 just prior to being turned off. These events are shown in the third graph 606 and the fourth graph 608 of FIG. 6 (note that the fourth graph 608 of FIG. 6 shows the same waveform as the third graph 606 of FIG. 6 at a different current scale). In some cases, almost the full load current (denoted "$I_{LD}$") flows through Shottkey diode 574, as shown in the fourth graph 608 of FIG. 6. While linear regulator 222 and Shottkey diode 574 are ON, and switching device 246 is OFF, capacitor 252a may quickly recharge to replenish any voltage lost during the switching device 246 PWM cycle (i.e., the non-extended portion of the PWM period).

It is worth noting that the ninth graph 618 shows a glitch in the voltage at terminal 555, approximately equal to $V_{CC}$ (i.e., the voltage at terminal 125) plus the voltage drop across Shottkey diode 574, lasting for the extended portion of the linear regulator 222 PWM period (e.g., the 1/25th of the linear regulator 222 PWM cycle extending past the switching device 246 PWM cycle, where K=25). This glitch may cause a small decline in the inductor current (i.e., the current through terminal 555) for its small duration. However, as long as a large enough value of K is selected, the glitch may not substantially affect the output of the power supply 500.

A function of keeping linear regulator 222 ON for an extended duration may be to provide auxiliary power to the switching controller module 130 to help regulate terminal 125 to maintain a regulated $V_{CCR}$, as described above. In this way, linear regulator 222 may serve as both a linear regulator while the power supply 500 is in standby or start-up mode, and as a "bang bang" controller while the power supply is in normal operating mode. Because the "bang bang" control may only be necessary to replenish voltage lost by capacitor 252a during the switching device 246 PWM cycle, it may be desirable to synchronize the switching device 246 and linear regulator 222 PWM cycles (i.e., avoid turning on Shottkey diode 574) during cycles where terminal 125 has exceeded $V_{CCR}$ (or more likely, where terminal 125 has exceeded some threshold amount above $V_{CCR}$, designated as $V_{CCMX}$ on the first graph 602 of FIG. 6).

Looking at the first graph 602 of FIG. 6, there is a point in time ($t=t_{VCMX}$) where the voltage at terminal 125 of the switching controller module 130 exceeds the $V_{CCMX}$ threshold. At that time, the switching controller module 130 (e.g., the cycle extender module 410) may cause linear regulator 222 and switching device 246 to turn ON and OFF substantially in synchrony, as illustrated by the second graph 604 and the seventh graph 614 of FIG. 6. This scenario may be further illustrated by the fact that the charging cycle voltage (e.g., the voltage seen at terminal 555) during that time is shown in the ninth graph 618 of FIG. 6 as having a full charging cycle with no glitch. This condition may remain until the voltage at terminal 125 drops to $V_{CCMN}$, some threshold level below $V_{CCR}$, as shown in the same traces of FIG. 6.

It will be appreciated that this feedback control method (e.g., using a "bang bang" controller in this way) is only one of many feedback control methods, many of which are known in the art. For example, fully digital control, switched full analog control (e.g., controlling the extension duration of the linear regulator 222 PWM cycle, for example from around K=25 to around K=200 or more, in closed loop feedback while monitoring the level at terminal 125), and/or other control methods may be used according to the invention. In certain embodiments, control circuitry for regulating the output of the auxiliary power unit 470 uses an up/down counter. The up/down counter may create and vary the linear regulator 222 PWM cycle extension and adjust the extension duration during every successive PWM cycle, depending on measured desired auxiliary output voltage (e.g., using less extension if the output is too high and more extension if the output is too low). In one embodiment, once the extension duration goes to some preset minimum (e.g., 1/50th of the PWM cycle), the linear regulator 222 PWM cycle may be set to substantially match the duration of the switching device 246 PWM cycle until the auxiliary voltage output returns to a level less than a preset maximum. Each control method may be more or less desirable, for example, depending on the application-related importance of responsiveness, components used, cost considerations, etc.

It will be further appreciated that the linear regulator 222 PWM cycle extension may occur before or after each switching device 246 turn-on cycle, or in other ways. It will be even further appreciated that none of these various embodiments of auxiliary output voltage control is dependent on the value or regulation requirements of the switched output voltage 180 (e.g., $V_{BOOST}$). It will be appreciated that extracting energy for the auxiliary power unit 470 during the input energy cycle (e.g., as opposed to during the energy output cycle), may avoid energy loss due to the main power switch. This may make embodiments of the invention potentially more energy efficient than those power supplies that recycle output cycle energy for auxiliary power.

Those of skill in the art will appreciate that more than one auxiliary power unit 470 may be connected with the power supply 500 in a similar way to that disclosed above. Further, the output voltage of embodiments of the invention may be regulated and adjusted to whatever a load may require. In fact, in embodiments with more than one auxiliary output, those auxiliary outputs may also be regulated independently of each other. Even further, the auxiliary output or outputs may have no dependence on the main output power supply voltage and/or its regulation requirements. Even further, if the power demand of the main power supply is in standby where no output current demand is desired or needed, this invention may revert to a linear startup power source mode as needed.

It is worth noting that many typical configurations of switching power supplies, like the power supply 200 shown in FIG. 2, may use two or more power devices (e.g., switching device 246 and linear regulator 222 in FIG. 2) to dissipate high load power as currents flow through different portions of the power supply circuit. In the power supply 500 of FIG. 5, however, it will be appreciated that the effective series connection between switching device 246 and linear regulator 222 (from the perspective of switching device 246) may allow switching device 246 to be implemented as a low-voltage device.

Embodiments of the power supply 500 that implement switching device 246 as a low-voltage device may provide certain additional functionality. In certain embodiments, using a low-voltage switching device 246 device allows switching device 246 to be integrated within the controller circuitry (e.g., integrated with the switching controller module 130). For example, the same integrated circuit ("IC") implementation processes and technologies may be used with switching device 246 as with the other controller circuitry. This may allow the implementation of the power supply 500 to be smaller, cheaper, and/or faster. For example, some estimates show that for every reduction in voltage rating by a factor of two (i.e., to maintain the same current flow), the respective die size may be able to be decreased by around a factor of four. As such, if switching device 246 is implemented as a 12-volt device instead of a 600-volt device (with the same current flow), the die size required for switching device 246 may be reduced by around one hundred times.

Integrating switching device 246 into the controller circuitry may provide additional functionality, like the ability to more effectively employ certain types of sensors to improve the operation of the power supply 500. In one embodiment, the power supply 500 has an integrated switching device 246 and an integrated temperature sensor. If switching device 246 were an external (i.e., non-integrated) device, sensing the temperature of switching device 246 may require coupling (e.g., gluing) a temperature sensor with switching device 246, isolating the sensor signal, and feeding the sensor signal back into the IC. With an integrated temperature sensor, however, it may be possible to avoid the extra gluing, isolation, and/or feedback processes. In another embodiment, the power supply 500 has an integrated switching device 246 and an integrated current sensor. For example, integrating a current mirror device may be significantly easier to implement in an integrated environment, as will be appreciated by those of skill in the art.

Figure 7:
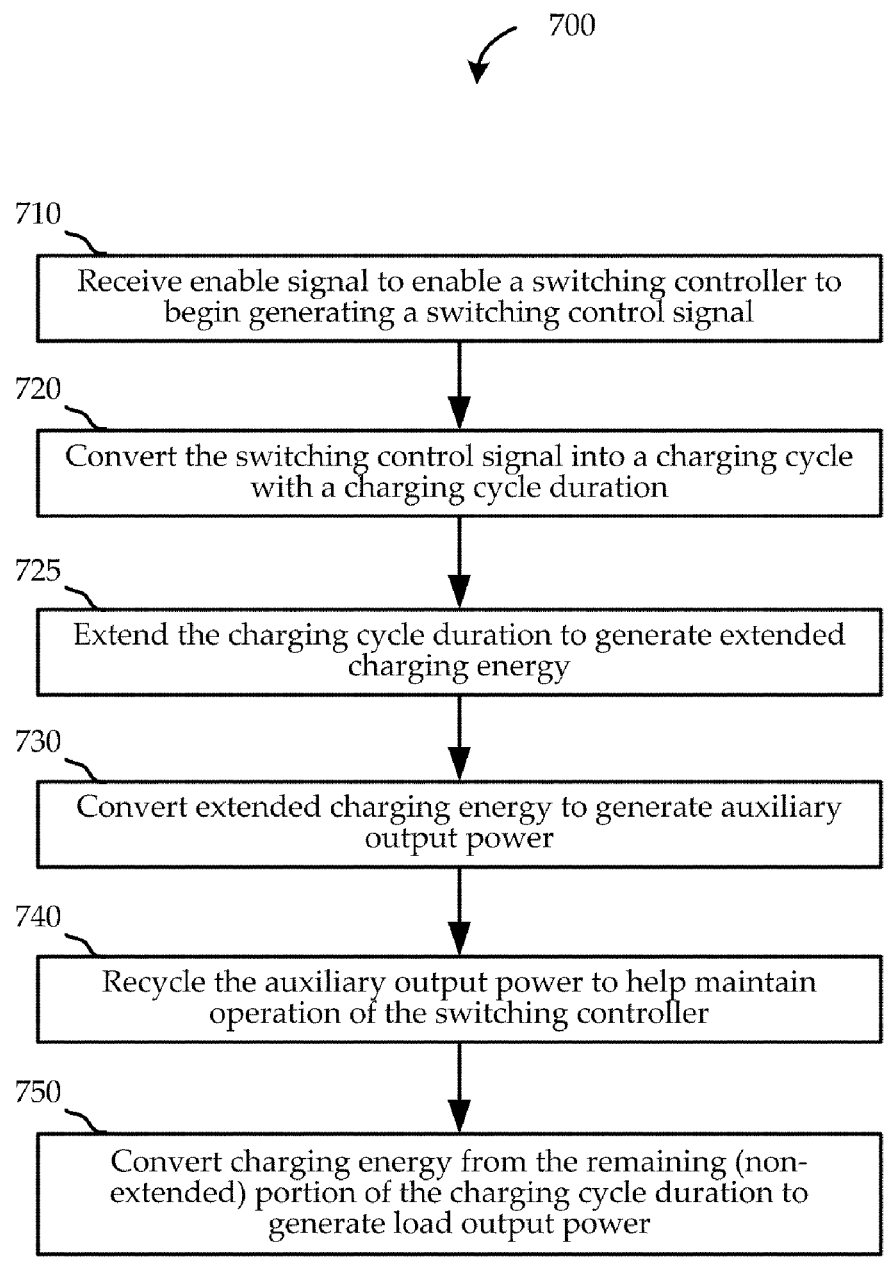
FIG. 7 shows a simplified flow diagram of exemplary methods for generating auxiliary power using cycle extension techniques, according to various embodiments of the invention.

FIG. 7 shows a simplified flow diagram of exemplary methods for generating auxiliary power, according to various embodiments of the invention. The method 700 begins at block 710 by receiving an enable signal to enable a switching controller to begin generating a switching control signal. At block 720, the switching control signal may be converted to a charging cycle with a charging cycle duration. For example, in some embodiments, the switching control signal is a PWM signal that uses a transistor to cyclically charge an inductor, the charging cycle duration being the "on" portion of the charging cycle.

During each charging cycle, the charging cycle duration may be extended to generate extended charging energy at block 725. The extended charging energy may then be used at block 730 for generating auxiliary output power. In some embodiments, at block 740, the auxiliary power may be recycled for use in maintaining appropriate power to the switching controller.

The remaining energy from each charging cycle (e.g., the energy from the non-extended portion of the charging cycle) may be used in block 750 to generate a load output voltage. In some embodiments, the output voltage is used to power a load. In certain embodiments, the charging energy is generated by charging an inductor during the charging cycle duration (e.g., the first half of the charging cycle, where the duty cycle of the charging cycle is 50%). During the second half of the charging cycle, the stored energy in the inductor may be used to charge a capacitor (or replenish charge in the capacitor). The charge across the capacitor may then be used as an output voltage for use across a load.

Embodiments Using Cycle Truncation

Figure 8:
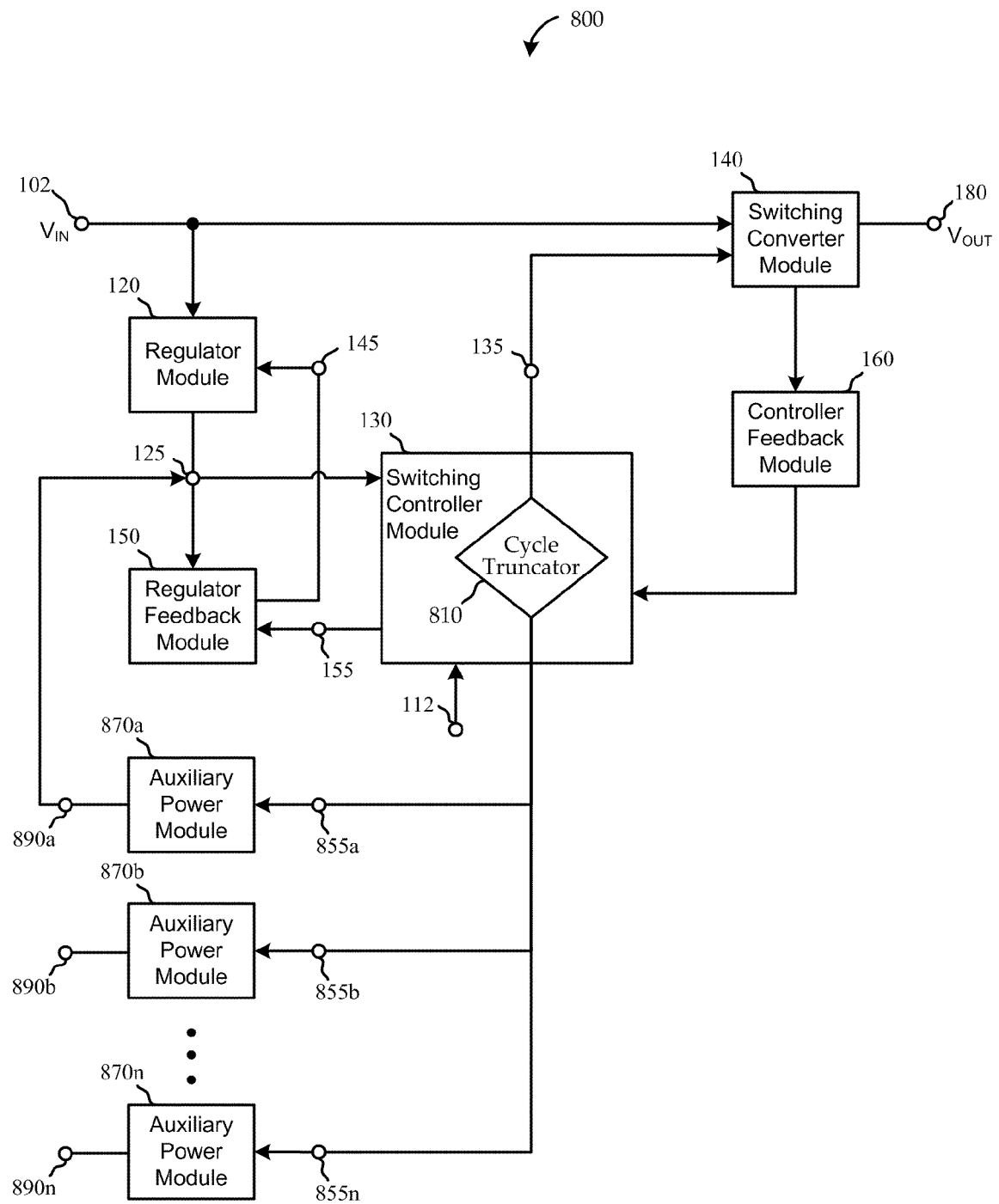
FIG. 8 shows a simplified block diagram of a system for generating auxiliary power using cycle truncation techniques, according to various embodiments of the invention.

FIG. 8 shows a simplified block diagram of a power supply 800 for generating auxiliary power using cycle truncation techniques, according to various embodiments of the invention. The power supply 800 receives an input voltage 102 and generates a switched output voltage 180 with a desired average output power. The power supply 800 includes a regulator module 120, a switching controller module 130, a switching converter module 140, and an auxiliary power module 870. The switching controller module 130 includes a cycle truncator module 810. In some embodiments, a voltage is received and rectified to generate the input voltage 102, as described with reference to FIG. 1.

In some embodiments, the cycle truncator module 810 in the switching controller module 130 generates a switching control signal at a gate driver terminal 135 for controlling the switching converter module 140. The switching converter module 140 may then convert the switching control signal to a charging cycle. In certain embodiments, the charging cycle is a PWM cycle with a duty cycle that defines an "on" duration and an "off" duration. During the "on" duration, one or more charge subsystems (e.g., an inductor or a capacitor) may charge. During the "off" cycle, the charge subsystem or subsystems may partially or completely discharge stored energy to one or more generator subsystems, including the switching converter module 140, and one or more auxiliary power modules 870. Embodiments of the cycle truncator module 810 truncate (e.g., shorten) the charging cycle, such that a portion of the charging cycle is directed to providing energy to one or more switching converter modules 140 (e.g., load power generators), and one or more other portions of the charging cycle are directed to providing energy to one or more auxiliary power modules 870 (e.g., generators for auxiliary loads, for maintaining controller power, etc.).

In startup or standby mode, the input voltage 102 is passed to the regulator module 120, which may be operable to provide and maintain power to the switching controller module 130. In some embodiments, this functionality is substantially identical to the functionality described with reference to FIGS. 1 and 4. Particularly, in some embodiments, the regulator module 120 includes a linear regulator (e.g., a depletion-mode transistor) configured in negative feedback through a regulator feedback module 150 (e.g., including an operational amplifier) to help provide a substantially constant source voltage to the switching controller module 130 at a controller source voltage terminal 125. Feedback from the regulator feedback module 150 is received by the regulator module 120 via an amplifier feedback terminal 145.

The switching controller module 130 may be operable to control the switching converter module 140 when enabled. In standby mode, the switching controller module 130 may remain energized in anticipation of an enable signal 112 (e.g., an "on" signal from a remote control). When enabled, the switching controller module 130 may generate one or more switching signals. For example, the switching controller module 130 may generate switched signals at a gate driver terminal 135 for driving the gate of a switching device in the switching converter module 140.

When the switching controller module 130 is enabled, the switching converter module 140 may begin to operate to convert the DC input voltage 102 into the switched output voltage 180. Typically, the switching converter module 140 includes a switching device (e.g., a MOSFET), operable to use information from the switching controller module 130 (e.g., via gate driver terminal 135) to generate a PWM signal. In some embodiments, the output voltage 180 (e.g., or other information, like current through the switching device in the switching converter module 140) is fed back to the switching controller module 130 through a controller feedback module 160 to regulate the output of the switching converter module 140.

In some embodiments, the cycle truncator module 810 in the switching controller module 130 truncates the PWM signal controlling the switching converter module 140, effectively creating a shorter PWM signal (i.e., having a shortened "on" duration) for charging a first charge subsystem. The truncated portion of the "on" duration may then be redirected to charge a second (e.g., and/or third, fourth, etc.) charge subsystem. The energy stored by the first charge subsystem may then be converted for use by the switching converter module 140 and the energy stored by the second charge subsystem may then be converted for use by one or more auxiliary power modules 870.

In one embodiment, auxiliary power output 890a generated by a first auxiliary power module 870a is recycled to maintain source power for components of the switching controller module 130 (e.g., via terminal 125). Other auxiliary power outputs (e.g., 890b-890n) are used by other systems or components, where available. The regulator module 120 may be disabled once the auxiliary power module 870 begins regulating the level at the controller source voltage terminal 125. Embodiments of the cycle truncator module 810 control the charging cycle (e.g., and the effective truncation of the charging cycle) via signals at the gate driver terminal 135 and one or more auxiliary control terminals 855.

Figure 9:
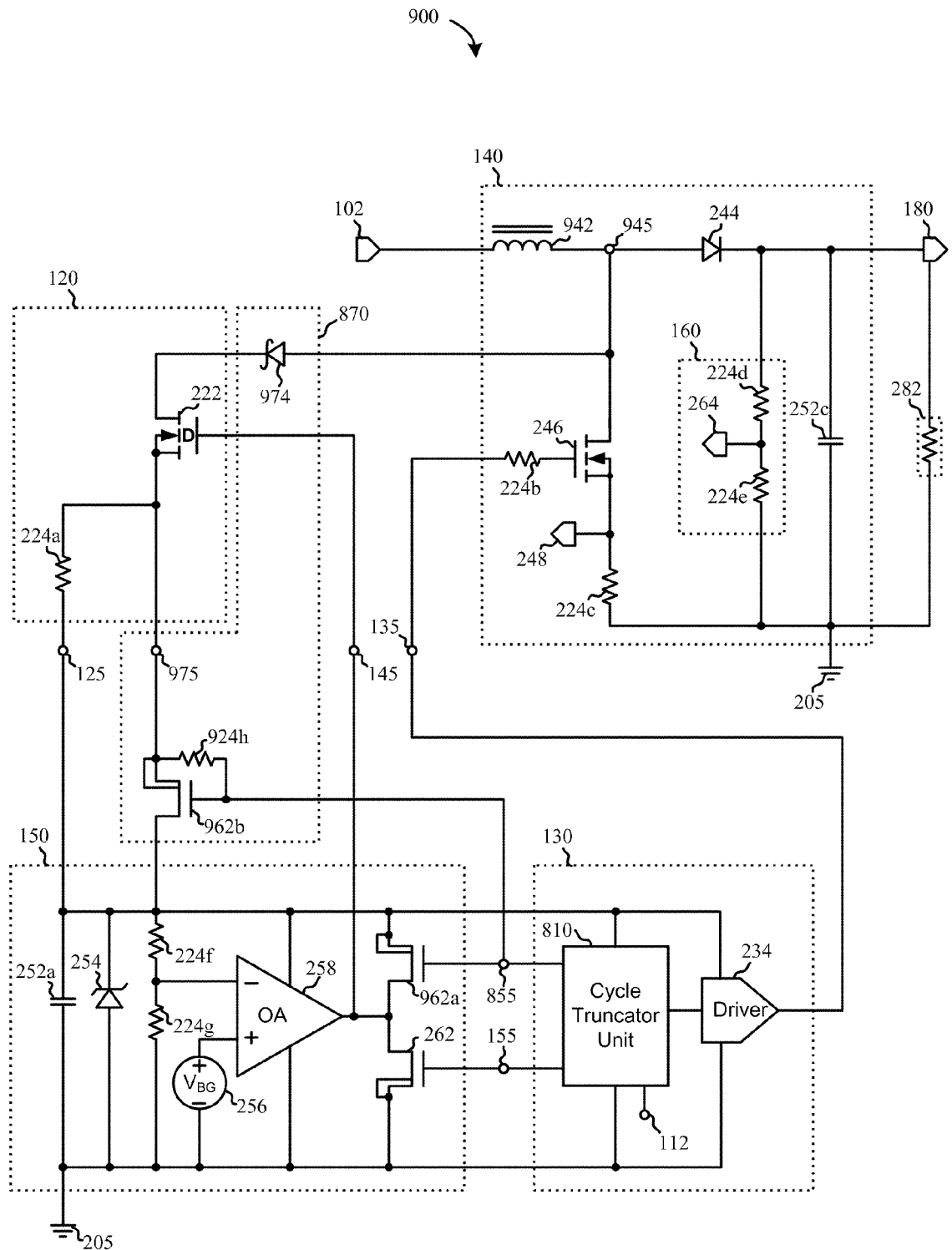
FIG. 9 shows a schematic diagram of a switching power supply that provides auxiliary power using an embodiment of the system of FIG. 8, according to various embodiments of the invention.
Figure 10:
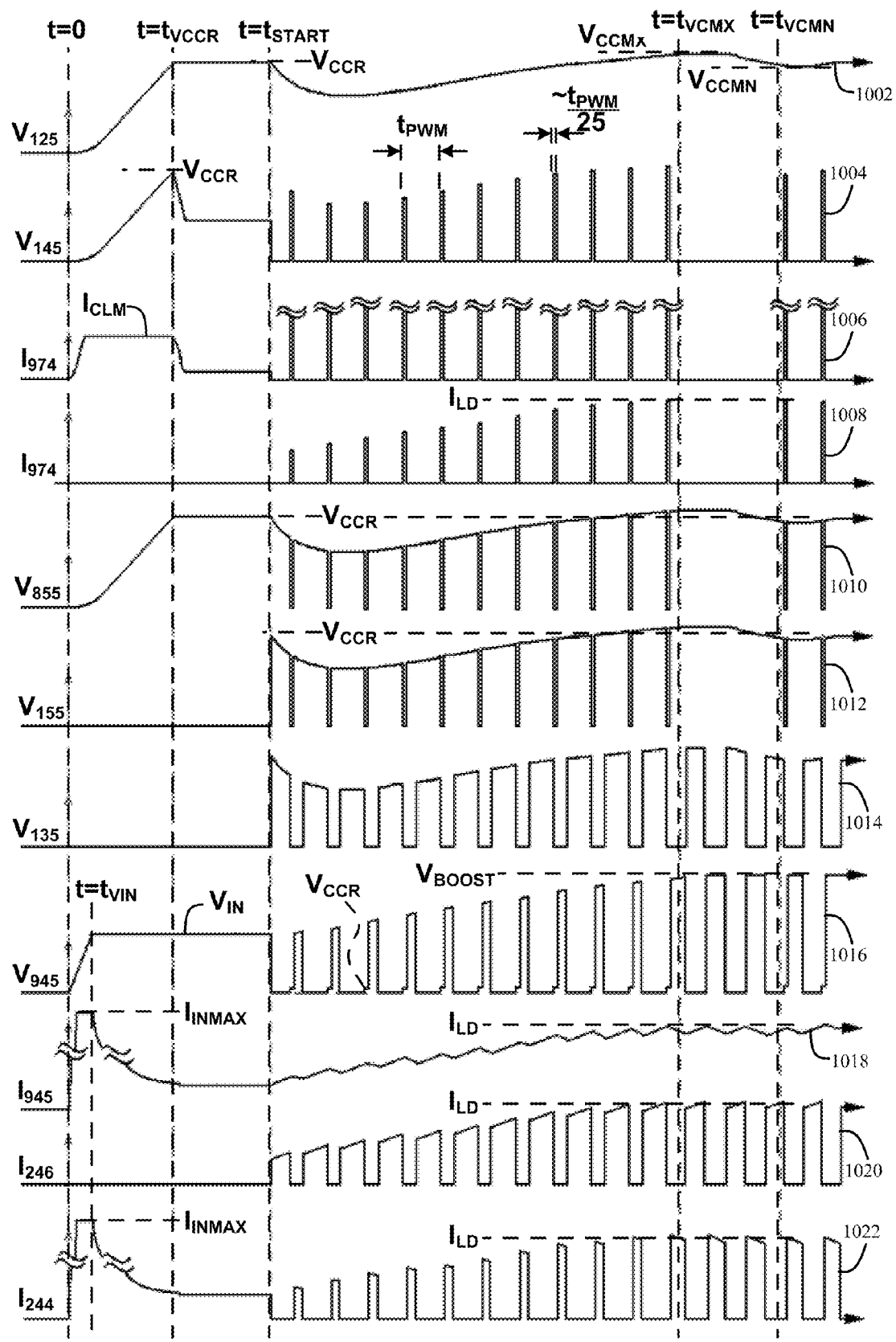
FIG. 10 provides an illustrative set of waveforms taken at various points in the power supply of FIG. 9.

It will be appreciated by those of skill in the art that there are a number of ways to implement the power supply 800. FIG. 9 shows a schematic diagram of a switching power supply 900 that provides auxiliary power using an embodiment of the system 800 of FIG. 8, according to various embodiments of the invention. FIG. 10 provides an illustrative set of waveforms taken at various points in the power supply 900 of FIG. 9. For added clarity, FIGS. 9 and 10 will be described in parallel.

The power supply 900 receives an input voltage 102 and generates a switched output voltage 180 with a desired characteristic (e.g., an average output voltage or power). The power supply 900 includes a regulator module 120, a switching controller module 130, a switching converter module 140, a regulator feedback module 150, a controller feedback module 160, and an auxiliary power module 870. Notably, unlike the power supply 200 in FIG. 2, the power supply 900 of FIG. 9 is shown with no transformer secondary (e.g., transformer secondary 272 of FIG. 2), fewer capacitors (e.g., capacitor 252b of FIG. 2 is absent), and only one Schottky diode (e.g., as opposed to FIG. 2, which includes Schottky diode 274a and Schottky diode 274b).

The rectified input voltage 102 is passed to the regulator module 120 (e.g., through an inductor 942 in the switching converter module 140), operable to provide and maintain power to the switching controller module 130 (e.g., at least in standby or startup modes). The regulator module 120 includes a linear regulator 222, embodied as a depletion-mode power-MOSFET, and a resistor 224a in series with the source of linear regulator 222 (e.g., to limit inrush current, as described above). Upon initial power-up, linear regulator 222 may provide start-up power by charging terminal 125 from the high-voltage rectified input voltage 102. Terminal 125 is configured to provide a regulated source voltage to the switching controller module 130.

As shown, the drain of switching device 246 is coupled with the intersection of inductor 942 and diode 244, shown as terminal 945 on the switched side of inductor 942. In some embodiments, inductor 942 is implemented as one side of a transformer (e.g., transformer primary 242 of FIG. 2); while in other embodiments, inductor 942 is implemented as an inductor or other similarly functional component. Terminal 945 is also connected with the anode of Schottky diode 974 (e.g., shown as part of the auxiliary power unit 870). The cathode of Shottkey diode 974 is connected with the drain of linear regulator 222. In this configuration, when switching device 246 is ON, Shottkey diode 974 is reversed biased, and current from terminal 945 flows through switching device 246. When switching device 246 is OFF and linear regulator 222 is ON, Shottkey diode 974 is forward biased, thereby causing current from terminal 945 to flow through linear regulator 222.

The gate terminal of the linear regulator 222 is connected with terminal 145 coming from the output of an operational amplifier 258 in the regulator feedback module 150. The regulator feedback module 150 may further include a capacitor 252a, configured at least to help maintain the level at terminal 125, as described above. It will be appreciated by those of skill in the art that, in this configuration, resistor 224a, Schottky diode 974, and zener diode 254 may provide additional regulation and/or protection for the regulator feedback module 150, as described above. The regulator feedback module 150 also includes a resistor divider network, having resistor 224f and resistor 224g. The node at which resistor 224f and resistor 224g are connected is also connected with an inverting input of operational amplifier 258. The non-inverting input of operational amplifier 258 may monitor a stable reference level (e.g., a bandgap reference) provided by a voltage source 256. The ratio of resistor 224f to resistor 224g may be chosen so that in negative closed loop feedback, a desired level (e.g., "$V_{CCR}$")is maintained at terminal 125 (e.g., a regulated 12-volt supply voltage is maintained for the switching controller module 130).

It will be appreciated that, in its startup and standby modes, the power supply 900 may operate substantially similarly to the power supply 200 of FIG. 2 or the power supply 500 of FIG. 5. This may be illustrated by the fact that, in the startup and standby regions, the first graph 302, the second graph 304, the third graph 306, the fourth graph 308, the fifth graph 310, the sixth graph 312, the seventh graph 314, and the eighth graph 316 of FIG. 3 are substantially identical to the first graph 1002, the second graph 1004, the third graph 1006, the seventh graph 1014, the eighth graph 1016, the ninth graph 1018, the tenth graph 1020, and the eleventh graph 1022 of FIG. 10, respectively.

In normal operation, the power supply 900 may operate significantly differently from the power supply 200 of FIG. 2, or even the power supply 500 of FIG. 5. At $t=t_{STRT}$, a first PWM cycle is started by driving the gate voltage of switching device 246 HIGH (e.g., turning it ON and allowing current to flow), as shown in the seventh graph 1014 of FIG. 10. The gate of switching device 246 is driven by the level at terminal 135, which may be controlled by a gate driver 234 and cycle truncator unit 810 in the switching controller module 130. This may initiate current flow though inductor 942 and diode 244 (i.e., through node 945), as shown in the ninth graph 1018 and the eleventh graph 1022 of FIG. 10.

Instead of switching device 246 conducting current for the full initial PWM charging cycle (e.g., as in the power supply 200 of FIG. 2), the switching device 246 charging cycle may be truncated by $t_{PWM}/K$. The value of K may be selected for a maximum expected auxiliary power required by the switching converter module 140 (e.g., and/or any other auxiliary power requirements of other auxiliary power modules 870). For example, K=25 may imply that the auxiliary power requirement is approximately 4% of the total expected power output of the flyback converter, which may typically be considered marginally acceptable. In other examples, K=50 may imply an approximate 2% auxiliary power requirement, while K=200 may imply an approximate 0.5% auxiliary power requirement.

In each PWM cycle, after the switching device 246 charging cycle is truncated (e.g., for the last ½sth of the PWM cycle, where K=25), linear regulator 222 may be turned ON by the actions of switch 962a and switch 262 (e.g., controlled by terminals 855 and 155, respectively), as shown in the fifth graph 1010 and the sixth graph 1012 of FIG. 10, respectively. The signal shown in the fifth graph 1010 of FIG. 10 may also turn on switch 962b. When ON, switch 962b may effectively short resistor 224a of the regulator module 120, thereby causing the current through linear regulator 222 to now be limited only by what was flowing through switching device 246 just prior to being turned off (e.g., as shown in the second graph 1004 of FIG. 10). In some cases, almost the full inductor 942 current may flow from terminal 945 through linear regulator 222, as shown in the ninth graph 1018 of FIG. 10. While linear regulator 222 is on, capacitor 252a may quickly recharge to replenish the voltage lost during the other (i.e., non-truncated) portion of the PWM period (e.g., the other ²⁴⁄₂₅ths of the PWM cycle, where K=25).

It is worth noting that the eighth graph 1016 shows a glitch in the voltage at terminal 945 approximately equal to the voltage at terminal 125 plus the voltage drop across Shottkey diode 974, lasting for the truncated portion of the PWM period (e.g., the ½sth of the PWM cycle during which linear regulator 222 is on, where K=25). This glitch may cause a small decline in the inductor 942 current for its small duration. However, as long as a large enough value of K is selected, the glitch may not substantially affect the output of the power supply 900. For example, if $V_{CCR}$ is twelve volts, the rectified input voltage is approximately 160 volts, and K=25, the inductor 942 current may decline only by approximately 8% during the glitch duration (i.e., (½s)/50%, where the duty cycle of the PWM cycle is 90%).

A function of turning linear regulator 222 ON during the truncated portion of the PWM cycle may be to provide auxiliary power to the switching controller module 130 to help regulate terminal 125 to maintain $V_{CCR}$. In this way, linear regulator 222 may serve as both a linear regulator while the power supply 900 is in standby or startup mode, and as a "bang bang" controller while the power supply is in normal operating mode. Because the "bang bang" control may only be necessary to replenish voltage lost by capacitor 252a during the non-truncated portion of each PWM cycle, it may be desirable to avoid turning on linear regulator 222 during cycles where terminal 125 has exceeded $V_{CCR}$ (or more likely, where terminal 125 has exceed some threshold amount above $V_{CCR}$, designated as $V_{CCMX}$). It will be appreciated that linear regulator 222 may be sized according to its use as a regulator during standby or startup and/or as a power device for charging the auxiliary power module(s) 870. For example, where auxiliary power 890 requirements are a substantial portion of the output power 180 requirements, linear regulator 222 may be sized accordingly (e.g., may be implemented as a larger power device).

Looking at the first graph 1002 of FIG. 10, there is a point in time (t=$t_{VCMX}$) where the voltage at terminal 125 exceeds the $V_{CCMX}$ threshold. At that time, the switching controller module 130 may inhibit the pulse that turns on linear regulator 222 during the truncated portion of the PWM cycle, as illustrated by the second graph 1004, the third graph 1006, the fourth graph 1008, the fifth graph 1010, and the sixth graph 1012 of FIG. 10. This scenario may be further illustrated by the fact that the PWM cycle during that time is shown in the eighth graph 1016 of FIG. 10 as having a full (not truncated) charging cycle with no glitch. This condition may remain until the voltage at terminal 125 drops to $V_{CCMN}$, some threshold level below $V_{CCR}$, as shown in the same traces of FIG. 10.

As discussed above with reference to FIGS. 5 and 6, this feedback control method is only one of many feedback control methods, many of which are known in the art. For example, fully digital control, switched full analog control (e.g., controlling the width of the linear regulator 222 turn-on pulse, for example from around K=25 to around K=200 or more, in closed loop feedback while monitoring terminal 125), and/or other control methods may be used according to the invention. In certain embodiments, control circuitry for regulating the auxiliary output 890 (e.g., or terminal 125, if connected as shown in FIG. 9) of the auxiliary power unit 870 uses an up/down counter. The up/down counter may create and vary the on-pulse width and adjust the on-pulse width during every successive PWM cycle, depending on measured desired auxiliary output voltage (e.g., using a smaller pulse width if the output is too high and a larger pulse width if the output is too low). In one embodiment, once the pulse width goes to some preset minimum (e.g., ¹⁄₅₀th of the PWM cycle), the on-pulse width may be set to zero (i.e., cycles may be skipped) until the auxiliary voltage output returns to a level less than a preset maximum. Each control method may be more or less desirable, for example, depending on application-related importance of responsiveness, components used, cost considerations, etc.

It will be further appreciated that the linear regulator 222 turn-on pulse may occur at any point in the PWM (e.g., the M1 turn-on) cycle. For example, the linear regulator 222 turn-on pulse may occur at the beginning or in the middle of each PWM pulse. It will be even further appreciated that none of these various embodiments of auxiliary output voltage control is dependent on the value or regulation requirements of the switched output voltage 180 (e.g., $V_{BOOST}$). It will be appreciated that extracting energy for the auxiliary power unit 870 during the input energy cycle (e.g., as opposed to during the energy output cycle), may avoid energy loss due to the main power switch. This may make embodiments of the invention potentially more energy efficient than those power supplies that recycle output cycle energy for auxiliary power.

Various embodiments of the invention may provide more than one auxiliary power unit 870 coupled to the power supply 900. In certain embodiments, a number of auxiliary power units 870 use the same or different components to share fractional PWM cycle periods. Further in some embodiments, some or all of the additional auxiliary power units 870 are high-efficiency switching converters, implemented substantially like the switching converter module 130. In one embodiment, a set of components (e.g., a second Shottkey diode, a second linear regulator, and associated control and output filtering components) are connected to terminal 945 to create a second auxiliary power output 870b, as shown in FIG. 8.

For at least these reasons, the output voltage of embodiments of the invention may be regulated and adjusted to whatever a load may require. In fact, in embodiments with more than one auxiliary output, those auxiliary outputs may also be regulated independently of each other. Further, the auxiliary output or outputs may have no dependence on the main output power supply voltage and/or its regulation requirements. Even further, if the power demand of the main power supply is in stand-by where no output current demand is desired or needed, this invention may revert to a linear start-up power source mode as needed.

It is worth noting that it may not be possible, or may be relatively very difficult, to provide additional auxiliary power units in the power supply 200 of FIG. 2. One reason is that the output voltages may all be coupled to $V_{BOOST}$, such that only fractions of $V_{BOOST}$ may be created by the auxiliary power units. Another reason is that each separate auxiliary power unit may require an additional transformer winding.

Figure 11:
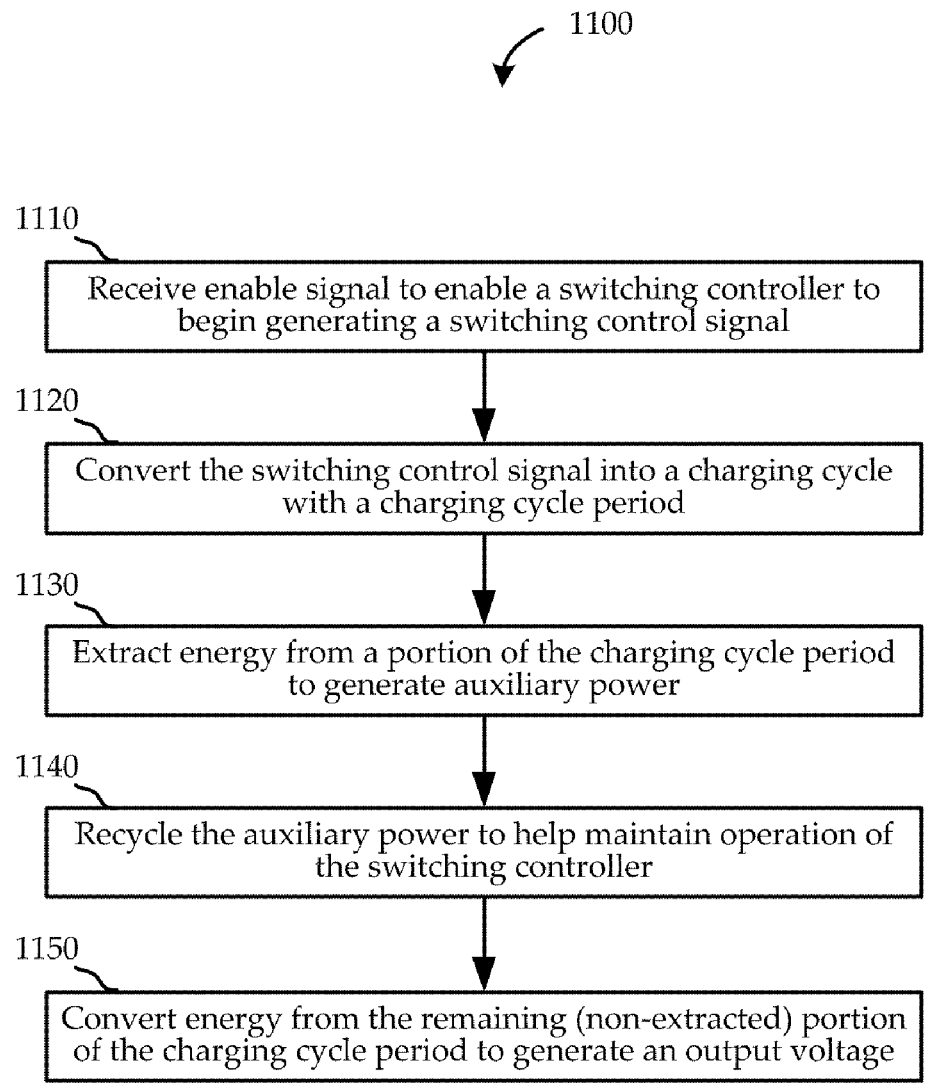
FIG. 11 shows a simplified flow diagram of exemplary methods for generating auxiliary power using cycle truncation techniques, according to various embodiments of the invention.

FIG. 11 shows a simplified flow diagram of exemplary methods for generating auxiliary power, according to various embodiments of the invention. The method 1100 begins at block 1110 by receiving an enable signal to enable a switching controller to begin generating a switching control signal. At block 1120, the switching control signal may be converted to a charging cycle with a charging cycle duration. For example, in some embodiments, the switching control signal is a PWM signal that uses a transistor to cyclically charge an inductor.

During each charging cycle, a portion of the energy may be extracted at block 1130 for use in generating auxiliary power. In some embodiments, multiple portions of the charging cycle may be extracted for use in generating multiple auxiliary power sources. Further, in some embodiments, at block 1140, the auxiliary power may be recycled for use in maintaining appropriate power to the switching controller.

In some embodiments, the remaining energy from each charging cycle (e.g., the energy from the non-extracted portion of the PWM cycle) may be used in block 1150 to generate an output voltage. In some embodiments, the output voltage is used to power a load. In certain embodiments, the charging energy is generated by charging an inductor during the charging cycle duration (e.g., the first half of the charging cycle, where the duty cycle of the charging cycle is 50%). During the second half of the charging cycle, the stored energy in the inductor may be used to charge a capacitor (or replenish charge in the capacitor). The charge across the capacitor may then be used as an output voltage for use across a load.

It should be noted that the methods, systems, and devices discussed above are intended merely to be examples. Specifically, any switching power converter that initially charges an inductor and then discharges it in a controlled manner to create the required voltage transformation may benefit from this invention. For example, embodiments of the invention may be implemented with "hard switching," "soft switching," boost, buck, flyback, or any other switching power supplies based on inductor charging cycles. In fact, this invention is not limited to being used with switching power supplies. The invention potentially allows for the creation of a non-isolated power supply so long as some inductor connected to a power source is available. For example, a winding from a motor or a transformer (which may essentially be an inductor) may be used to create an auxiliary power supply using techniques and components of this invention.

It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

It should also be appreciated that the following systems, methods, and software may individually or collectively be components of a larger system, wherein other procedures may take precedence over or otherwise modify their application. Also, a number of steps may be required before, after, or concurrently with the following embodiments.

Specific details are given in the description to provide a thorough understanding of the embodiments. However, it will be understood by one of ordinary skill in the art that the embodiments may be practiced without these specific details. For example, well-known circuits, processes, algorithms, structures, waveforms, and techniques have been shown without unnecessary detail in order to avoid obscuring the embodiments.

Further, it may be assumed at various points throughout the description that all components are ideal (e.g., they create no delays and are lossless) to simplify the description of the key ideas of the invention. Those of skill in the art will appreciate that non-idealities may be handled through known engineering and design skills. It will be further understood by those of skill in the art that the embodiments may be practiced with substantial equivalents or other configurations. For example, circuits described with reference to N-channel transistors may also be implemented with P-channel devices, using modifications that are well known to those of skill in the art.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Accordingly, the above description should not be taken as limiting the scope of the invention, as described in the following claims

What is claimed is:

1. A power supply, comprising:
   a switching controller module, operable to generate a load switching signal and an auxiliary switching signal, wherein:
   the load switching signal comprises pulses, each pulse of the load switching signal having a pulse width defining a charging duration, a first portion of the charging duration being defined as a function of an operational load power and a second portion of the charging duration being defined as a function of an operational auxiliary power; and
   the auxiliary switching signal comprises pulses, each pulse of the auxiliary switching signal having a pulse width defined by the second portion of the charging duration;
   a load power module, communicatively coupled with the switching controller module, and operable to generate output load power as a function of an input power signal and the load switching signal, such that the output load power is generated during the first portion of the charging duration; and
   an auxiliary power module, communicatively coupled with the switching controller module, and operable to generate output auxiliary power as a function of the input power signal, the load switching signal, and the auxiliary switching signal, such that the output auxiliary power is generated during the second portion of the charging duration.

2. The power supply of claim 1, wherein:
   the switching controller module is configured to be powered by a source voltage level within an operating range; and the auxiliary power module is further operable to maintain the source voltage substantially within the operating range.

3. The power supply of claim 1, further comprising:
a load power feedback module, operable to:
monitor the output load power; and
adjust the pulse width of at least some of the pulses of the load switching signal to maintain the output load power substantially at the operational load power.

4. The power supply of claim 1, further comprising:
a load power feedback module, operable to:
monitor the output load power; and
adjust the frequency of the load switching signal to maintain the output load power substantially at the operational load power.

5. The power supply of claim 1, further comprising:
an auxiliary power feedback module, operable to:
monitor the output auxiliary power; and
adjust the pulse width of at least some of the pulses of the auxiliary switching signal to maintain the output auxiliary power substantially at the operational auxiliary power.

6. The power supply of claim 1, further comprising:
a regulator module, comprising a high-power regulator device operable to generate a regulated source voltage as a function of the input power signal,
wherein the load power module comprises a low-power switching device in series with the high-power regulator device.

7. The power supply of claim 6, wherein:
the high-power regulator device is switched as a function of the auxiliary switching signal and the low-power switching device is switched as a function of the load switching signal, such that charging current is routed to the auxiliary power module through the high-power regulator device during the second portion of the charging duration.

8. The power supply of claim 7, wherein:
the regulator module further comprises a current limiting device;
the auxiliary power module further comprises a switched current path substantially in parallel to the current limiting device and is configured so that current is routed through the current limiting device when the switched current path is switched off and current is routed through the switched current path when the switched current path is switched on,
wherein the switched current path and the high-power regulator device are switched substantially synchronously as a function of the auxiliary switching signal so that charging current routed to the auxiliary power module during the second portion of the charging duration is routed through the switched current path.

9. The power supply of claim 6, further comprising:
an integrated circuit comprising the switching controller module and the load power module.

10. The power supply of claim 1, further comprising:
a regulator module, operable to generate a regulated source voltage as a function of the input power signal,
wherein the switching controller module is configured to operate in a first mode and a second mode, such that the switching controller module generates the load switching signal only in the second mode, and the switching controller module is powered by the regulated source voltage only in the first mode.

11. The power supply of claim 10, wherein:
the switching controller module is further configured to switch from the first mode to the second mode upon receipt of an enable signal.

12. The power supply of claim 1,
wherein the load power module comprises a boost converter.

13. A power supply, comprising:
means for generating a load switching signal comprising pulses, each pulse of the load switching signal having a pulse width defining a charging duration, a first portion of the charging duration being defined as a function of an operational load power and a second portion of the charging duration being defined as a function of an operational auxiliary power;
means for generating an auxiliary switching signal comprising pulses, each pulse of the auxiliary switching signal having a pulse width defined by the second portion of the charging duration;
means for generating output load power during the first portion of the charging duration as a function of an input power signal and the load switching signal; and
means for generating output auxiliary power during the second portion of the charging duration as a function of the input power signal, the load switching signal, and the auxiliary switching signal.

14. The power supply of claim 13, further comprising:
means for powering the means for generating the load switching signal by converting output auxiliary power to a source voltage applied to the means for generating the load switching signal.

15. The power supply of claim 13, further comprising:
means for monitoring the output load power; and
means for adjusting the pulse width of at least some of the pulses of the load switching signal to maintain the output load power substantially at the operational load power.

16. The power supply of claim 13, further comprising:
means for monitoring the output load power; and
means for adjusting the frequency of the load switching signal to maintain the output load power substantially at the operational load power.

17. The power supply of claim 13, further comprising:
means for monitoring the output auxiliary power; and
means for adjusting the pulse width of at least some of the pulses of the auxiliary switching signal to maintain the output auxiliary power substantially at the operational auxiliary power.

18. The power supply of claim 13, further comprising:
means for integratedly housing at least the means for generating the load switching signal and the means for generating output load power.

19. The power supply of claim 13, further comprising:
means for housing at least the means for generating the load switching signal, the means for generating the auxiliary switching signal.

20. A method for supplying power, comprising:
generating a charging cycle for a power converter module, the charging cycle having a charging duration;
charging a first power subsystem during a first portion of the charging duration using the power converter module;
charging a second power subsystem during a second portion of the charging duration using the power converter module;
outputting an output load power using the first power subsystem;
outputting an output auxiliary power using the second power subsystem;

determining an operational load power and an operational auxiliary power;

regulating a duration of the first portion of the charging duration as a function of the operational load power; and regulating a duration of the second portion of the charging duration as a function of the operational auxiliary power, wherein the charging duration is substantially the sum of the duration of the first portion and the duration of the second portion.

21. The method of claim 20, wherein generating the charging cycle for the power converter module comprises:

generating a load switching signal comprising pulses, each pulse of the load switching signal having a pulse width defining the charging duration; and generating an auxiliary switching signal comprising pulses, each pulse of the auxiliary switching signal having a pulse width defined by the second portion of the charging duration.

22. The method of claim 21, further comprising:
determining an operational load power;
monitoring the output load power with respect to the operational load power; and
adjusting the pulse width of at least some of the pulses of the load switching signal to maintain the output load power substantially at the operational load power.

23. The method of claim 21, further comprising:
determining an operational load power;
monitoring the output load power with respect to the operational load power; and
adjusting the frequency of the load switching signal to maintain the output load power substantially at the operational load power.

24. The method of claim 21, further comprising:
determining an operational auxiliary power;
monitoring the output auxiliary power with respect to the operational auxiliary power; and
adjusting the pulse width of at least some of the pulses of the auxiliary switching signal to maintain the output auxiliary power substantially at the operational auxiliary power.

25. The method of claim 20, further comprising:
converting at least a portion of the output auxiliary power to a regulated source voltage,
wherein generating the charging cycle for the power converter module comprises using a charging cycle generator to generate the charging cycle, and tale charging cycle generator is powered by the regulated source voltage.

* * * * *